US012595157B2

(12) United States Patent
Blake et al.

(10) Patent No.: US 12,595,157 B2
(45) Date of Patent: Apr. 7, 2026

(54) PACKAGE COUPLING APPARATUS WITH ATTACHMENT PLATE FOR SECURING A PACKAGE TO A UAV AND METHOD OF SECURING A PACKAGE FOR DELIVERY

(71) Applicant: Wing Aviation LLC, Mountain View, CA (US)

(72) Inventors: Jesse Blake, Sunnyvale, CA (US); Evan Twyford, Mountain View, CA (US); Ivan Qiu, Mountain View, CA (US); Jasper Lewin, Mountain View, CA (US)

(73) Assignee: Wing Aviation LLC, Palo Alto, CA (US)

( * ) Notice: Subject to any disclaimer, the term of this patent is extended or adjusted under 35 U.S.C. 154(b) by 321 days.

(21) Appl. No.: 17/555,058

(22) Filed: Dec. 17, 2021

(65) Prior Publication Data

US 2023/0192449 A1 Jun. 22, 2023

(51) Int. Cl.
*B64D 1/22* (2006.01)
*B65D 5/46* (2006.01)
*B65D 75/56* (2006.01)
*B66C 1/10* (2006.01)
*B64U 101/66* (2023.01)
*B64U 101/67* (2023.01)

(52) U.S. Cl.
CPC ............... *B66C 1/101* (2013.01); *B64D 1/22* (2013.01); *B65D 5/46016* (2013.01); *B65D 75/56* (2013.01); *B64U 2101/66* (2023.01); *B64U 2101/67* (2023.01)

(58) Field of Classification Search
CPC ..................................................... B65D 75/56
USPC ................................... 383/11, 17, 20, 21, 25
See application file for complete search history.

(56) References Cited

U.S. PATENT DOCUMENTS

| | | | | | |
|---|---|---|---|---|---|
| 1,524,399 | A | * | 1/1925 | Krueger | B65D 5/46008 16/407 |
| 2,011,407 | A | * | 8/1935 | Hirsch | B65D 75/56 229/117.23 |
| 2,059,643 | A | * | 11/1936 | Kobler | B65D 75/56 16/407 |
| 2,093,616 | A | * | 9/1937 | Mo | B65D 75/56 229/117.23 |
| 2,179,037 | A | * | 11/1939 | Goldschmidt | B65D 63/18 206/390 |
| 3,656,205 | A | * | 4/1972 | Anderson | A45C 13/26 16/409 |

(Continued)

FOREIGN PATENT DOCUMENTS

| | | | |
|---|---|---|---|
| JP | H08119421 | A | 5/1996 |
| JP | 3155859 | U | 12/2009 |

(Continued)

*Primary Examiner* — Mollie Impink
(74) *Attorney, Agent, or Firm* — McDonnell Boehnen Hulbert & Berghoff LLP

(57) ABSTRACT

A package coupling apparatus for securing a package to an unmanned aerial vehicle (UAV) is provided. The package coupling apparatus includes a support plate configured to be secured to an upper surface of the package and a handle extending up from the support plate. The handle includes a handle opening and a bridge that extends over the handle opening, wherein the bridge is configured to be secured by a component of the UAV.

15 Claims, 20 Drawing Sheets

(56)                    References Cited

U.S. PATENT DOCUMENTS

| | | | | |
|---|---|---|---|---|
| 4,487,319 | A * | 12/1984 | Barrash | B65D 5/46032 |
| | | | | 206/427 |
| 8,032,986 | B2 * | 10/2011 | Lawrence | B65D 33/06 |
| | | | | 220/759 |
| 9,060,591 | B1 * | 6/2015 | White | A45F 5/10 |
| 10,035,623 | B1 | 7/2018 | Prager et al. | |
| 10,131,428 | B1 | 11/2018 | Sopper et al. | |
| 10,301,024 | B1 | 5/2019 | Sopper et al. | |
| 10,308,360 | B2 | 6/2019 | Sopper et al. | |
| 10,577,105 | B2 | 3/2020 | Prager | |
| 10,793,272 | B2 | 10/2020 | Shannon et al. | |
| 10,793,274 | B2 | 10/2020 | Prager et al. | |
| 2019/0359332 | A1 | 11/2019 | Shannon | |
| 2020/0207474 | A1 | 7/2020 | Foggia et al. | |
| 2021/0380241 | A1 | 12/2021 | Dichter | |

FOREIGN PATENT DOCUMENTS

| | | |
|---|---|---|
| KR | 20-1992-0003284 | 2/1992 |
| WO | 2019195141 A1 | 10/2019 |

* cited by examiner

1000

1026

1024

1017

1010

1022

1000

1022

1052

1022

1500

1560

1510

1524

1510

1517

PACKAGE COUPLING APPARATUS WITH ATTACHMENT PLATE FOR SECURING A PACKAGE TO A UAV AND METHOD OF SECURING A PACKAGE FOR DELIVERY

BACKGROUND

An unmanned vehicle, which may also be referred to as an autonomous vehicle, is a vehicle capable of travel without a physically-present human operator. An unmanned vehicle may operate in a remote-control mode, in an autonomous mode, or in a partially autonomous mode.

When an unmanned vehicle operates in a remote-control mode, a pilot or driver that is at a remote location can control the unmanned vehicle via commands that are sent to the unmanned vehicle via a wireless link. When the unmanned vehicle operates in autonomous mode, the unmanned vehicle typically moves based on pre-programmed navigation waypoints, dynamic automation systems, or a combination of these. Further, some unmanned vehicles can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of unmanned vehicles exist for various different environments. For instance, unmanned vehicles exist for operation in the air, on the ground, underwater, and in space. Examples include quad-copters and tail-sitter UAVs, among others. Unmanned vehicles also exist for hybrid operations in which multi-environment operation is possible. Examples of hybrid unmanned vehicles include an amphibious craft that is capable of operation on land as well as on water or a floatplane that is capable of landing on water as well as on land. Other examples are also possible.

SUMMARY

The present embodiments are directed to a package coupling apparatus configured to be attached to a package and includes structures that can be secured by a component of the UAV, such as a payload retriever. With the package secured to the UAV using the package coupling apparatus, the payload can be safely transported or raised and lowered by manipulating a tether attached to the payload retriever.

In one aspect, a package coupling apparatus for securing a package to an unmanned aerial vehicle (UAV) is provided. The package coupling apparatus includes a support plate configured to be secured to an upper surface of the package and a handle extending up from the support plate. The handle includes a handle opening and a bridge that extends over the handle opening, wherein the bridge is configured to be secured by a component of the UAV.

In another aspect, a system for carrying a payload using an unmanned aerial vehicle (UAV) is provided. The system includes a package for housing the payload that has an upper surface and a lower surface. The system also includes a package coupling apparatus having a support plate secured to the upper surface of the package and a handle extending up from the support plate. The handle includes a handle opening and a bridge that extends over the handle opening, where the bridge is configured to be secured by a component of the UAV.

In another aspect, a method of securing a package for carrying a payload using an unmanned aerial vehicle (UAV) is provided. The method includes securing a support plate of a package coupling apparatus against an upper surface of the package such that a handle of a hanger extends up from the support plate. The handle includes a handle opening and a bridge that extends over the handle opening. The bridge is configured to be received by a payload retriever of the UAV.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1A:
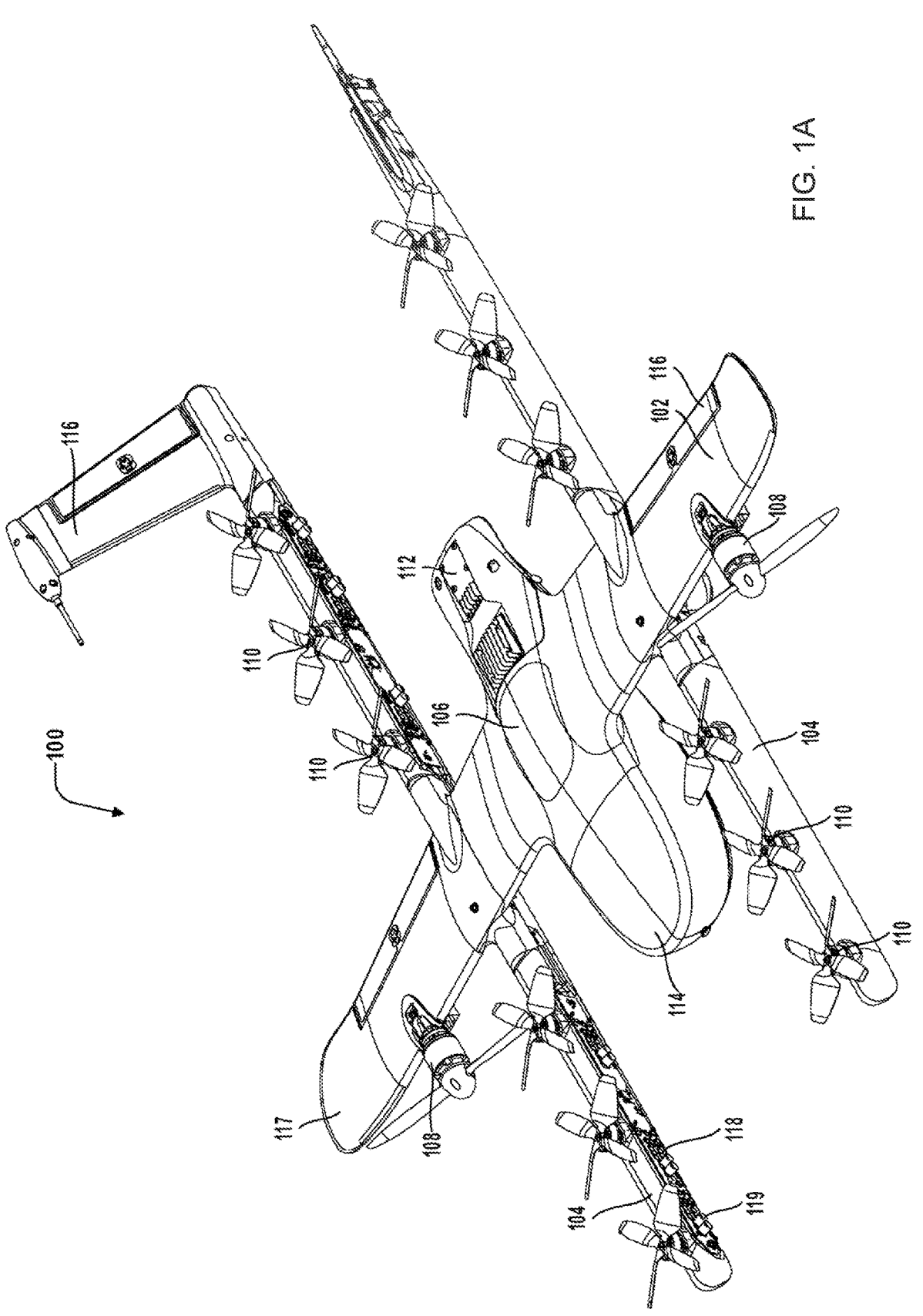
FIG. 1A is a simplified illustration of an unmanned aerial vehicle, according to an example embodiment.

Exemplary methods and systems are described herein. It should be understood that the word "exemplary" is used herein to mean "serving as an example, instance, or illustration." Any implementation or feature described herein as "exemplary" or "illustrative" is not necessarily to be construed as preferred or advantageous over other implementations or features. In the figures, similar symbols typically identify similar components, unless context dictates otherwise. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are contemplated herein.

I. Overview

The present embodiments are related to the use of unmanned aerial vehicles (UAVs) or unmanned aerial systems (UASs) (referred to collectively herein as UAVs) that are used to carry a payload to be delivered or retrieved. As examples, UAVs may be used to deliver or retrieve a payload to or from an individual or business. In operation the payload to be delivered is secured to the UAV and the UAV is then flown to the desired delivery site. The payload may be secured beneath the UAV, positioned within the UAV, or positioned partially within the UAV, as the UAV flies to the delivery site. Once the UAV arrives at the delivery site, the UAV may land to deliver the payload, or may be operated in a hover mode while the payload is either dropped or lowered from the UAV towards the delivery site using a tether and a winch mechanism positioned within the UAV.

The payload may include a package that encloses goods that are to be delivered by the UAV. The package may protect the goods enclosed therein from weather, dirt, impacts, and other adverse conditions. In some instances, the package may be designed with various features that are intended for securing the package to the UAV. For example, some packages include a handle specifically designed to engage a payload retriever of a UAV. In other instances, the package may have a size and shape that is designed for another purpose, such as shipping or retail display. For example, many packages are in the form of a rectangular box, which is easy to manufacture and can be stored efficiently with other similar boxes. Moreover, many packages are designed without features intended for coupling the package to a UAV.

The present embodiments provide a package coupling apparatus that is configured to be attached to a package and includes structures that can be secured by a component of the UAV, such as a payload retriever. For example, the package coupling apparatus may include a support plate that is configured to be secured to the upper surface of the package and a handle that is configured to be secured by the UAV. The handle may include an opening and a bridge that extends over the opening. To secure the handle to the UAV, the bridge of the handle may be received by the payload retriever of the UAV. Accordingly, with the package secured to the UAV using the package coupling apparatus, the payload can be safely transported or raised and lowered by manipulating a tether attached to the payload retriever.

To prepare a package for delivery by the UAV, the package coupling apparatus may be positioned with the support plate against the package and the handle extending upward from the support plate. With the package coupling apparatus firmly secured to the package, the payload retriever of the UAV may be hooked onto the handle of the hanger. If a tether that holds the payload retriever is unwound, it may then be retracted using a winch in order to draw the secured package toward the body of the UAV. The package may then be safely transported for delivery.

The package coupling apparatus allows the handle of the hanger to extend upward to an easily accessible position above the upper surface of the package. Accordingly, the handle may be received by a payload retriever on a tether of the UAV, allowing the package to be received, raised toward the UAV for transport, and then lowered for delivery. Moreover, the location of the handle adjacent to the upper surface of the package allows the package to be transported by the UAV with a relatively short distance between the payload retriever and the package. This allows the package to be secured near the body of the UAV or even inside the UAV.

Securing the package coupling apparatus to the package using a support plate can help maintain the handle of the package coupling apparatus close to the upper surface of the package. By carrying the package using a handle, the upward force applied to the package by the UAV may be concentrated at the location of the handle. This concentration of the upward force can lead to tenting of the upper surface of the package, tenting of structures that secure the handle to the package, or separation between the handle and the package, each of which adds to the distance between the bridge of the handle and the bottom of the package. To address this challenge, the support plate can spread the upward force applied to the handle over the upper surface of the package, which may maintain a desired height between the handle and the bottom of the package.

The handle is coupled to the support plate so that a secure attachment exists between the handle and the package. In some embodiments, the handle and support plate may be integrally formed. Alternatively, in some embodiments, the handle may be part of a hanger that includes a base, and the base may be coupled to the support plate. For example, the support plate may include an aperture and the handle may extend through the aperture with the base being secured under the support plate.

In some embodiments, the lower surface of the support plate may be coated with an adhesive so that the lower surface of the support plate may be adhered to the upper surface of the package. Moreover, in some embodiments, the package coupling apparatus may include flaps that extend outward from the edges of the support plate and the flaps may include an adhesive. The flaps may be used to secure the support plate to the package by adhering the flaps to the side surfaces of the package. The flaps may be installed on the support plate before it is positioned on the package, or the flaps may be secured to the support plate and the package in the same operation. As another alternative, the support plate can be taped to the upper surface of the package. For example, a first strip of tape may be positioned to extend over a first edge of the support plate and onto a first side surface of the package, and a second strip of tape may be positioned to extend over a second edge of the support plate and onto a second side surface of the package.

II. Illustrative Unmanned Vehicles

Herein, the terms "unmanned aerial vehicle" and "UAV" refer to any autonomous or semi-autonomous vehicle that is capable of performing some functions without a physically present human pilot.

A UAV can take various forms. For example, a UAV may take the form of a fixed-wing aircraft, a glider aircraft, a tail-sitter aircraft, a jet aircraft, a ducted fan aircraft, a lighter-than-air dirigible such as a blimp or steerable balloon, a rotorcraft such as a helicopter or multicopter, and/or an ornithopter, among other possibilities. Further, the terms "drone," "unmanned aerial vehicle system" (UAVS), or "unmanned aerial system" (UAS) may also be used to refer to a UAV.

FIG. 1A is an isometric view of an example UAV 100. UAV 100 includes wing 102, booms 104, and a fuselage 106. Wings 102 may be stationary and may generate lift based on the wing shape and the UAV's forward airspeed. For instance, the two wings 102 may have an airfoil-shaped cross section to produce an aerodynamic force on UAV 100. In some embodiments, wing 102 may carry horizontal propulsion units 108, and booms 104 may carry vertical propulsion units 110. In operation, power for the propulsion units may be provided from a battery compartment 112 of fuselage 106. In some embodiments, fuselage 106 also includes an avionics compartment 114, an additional battery compartment (not shown) and/or a delivery unit (not shown, e.g., a winch system) for handling the payload. In some embodiments, fuselage 106 is modular, and two or more compartments (e.g., battery compartment 112, avionics compartment 114, other payload and delivery compartments) are detachable from each other and securable to each other (e.g., mechanically, magnetically, or otherwise) to contiguously form at least a portion of fuselage 106.

In some embodiments, booms 104 terminate in rudders 116 for improved yaw control of UAV 100. Further, wings 102 may terminate in wing tips 117 for improved control of lift of the UAV.

In the illustrated configuration, UAV 100 includes a structural frame. The structural frame may be referred to as a "structural H-frame" or an "H-frame" (not shown) of the UAV. The H-frame may include, within wings 102, a wing spar (not shown) and, within booms 104, boom carriers (not shown). In some embodiments the wing spar and the boom carriers may be made of carbon fiber, hard plastic, aluminum, light metal alloys, or other materials. The wing spar and the boom carriers may be connected with clamps. The wing spar may include pre-drilled holes for horizontal propulsion units 108, and the boom carriers may include pre-drilled holes for vertical propulsion units 110.

In some embodiments, fuselage 106 may be removably attached to the H-frame (e.g., attached to the wing spar by clamps, configured with grooves, protrusions or other features to mate with corresponding H-frame features, etc.). In other embodiments, fuselage 106 similarly may be removably attached to wings 102. The removable attachment of fuselage 106 may improve quality and or modularity of UAV 100. For example, electrical/mechanical components and/or subsystems of fuselage 106 may be tested separately from, and before being attached to, the H-frame. Similarly, printed circuit boards (PCBs) 118 may be tested separately from, and before being attached to, the boom carriers, therefore eliminating defective parts/subassemblies prior to completing the UAV. For example, components of fuselage 106 (e.g., avionics, battery unit, delivery units, an additional battery compartment, etc.) may be electrically tested before fuselage 106 is mounted to the H-frame. Furthermore, the motors and the electronics of PCBs 118 may also be electrically tested before the final assembly. Generally, the identification of the defective parts and subassemblies early in the assembly process lowers the overall cost and lead time of the UAV. Furthermore, different types/models of fuselage 106 may be attached to the H-frame, therefore improving the modularity of the design. Such modularity allows these various parts of UAV 100 to be upgraded without a substantial overhaul to the manufacturing process.

In some embodiments, a wing shell and boom shells may be attached to the H-frame by adhesive elements (e.g., adhesive tape, double-sided adhesive tape, glue, etc.). Therefore, multiple shells may be attached to the H-frame instead of having a monolithic body sprayed onto the H-frame. In some embodiments, the presence of the multiple shells reduces the stresses induced by the coefficient of thermal expansion of the structural frame of the UAV. As a result, the UAV may have better dimensional accuracy and/or improved reliability.

Moreover, in at least some embodiments, the same H-frame may be used with the wing shell and/or boom shells having different size and/or design, therefore improving the modularity and versatility of the UAV designs. The wing shell and/or the boom shells may be made of relatively light polymers (e.g., closed cell foam) covered by the harder, but relatively thin, plastic skins.

The power and/or control signals from fuselage 106 may be routed to PCBs 118 through cables running through fuselage 106, wings 102, and booms 104. In the illustrated embodiment, UAV 100 has four PCBs, but other numbers of PCBs are also possible. For example, UAV 100 may include two PCBs, one per the boom. The PCBs carry electronic components 119 including, for example, power converters, controllers, memory, passive components, etc. In operation, propulsion units 108 and 110 of UAV 100 are electrically connected to the PCBs.

Many variations on the illustrated UAV are possible. For instance, fixed-wing UAVs may include more or fewer rotor units (vertical or horizontal), and/or may utilize a ducted fan or multiple ducted fans for propulsion. Further, UAVs with more wings (e.g., an "x-wing" configuration with four wings), are also possible. Although FIG. 1 illustrates two wings 102, two booms 104, two horizontal propulsion units 108, and six vertical propulsion units 110 per boom 104, it should be appreciated that other variants of UAV 100 may be implemented with more or less of these components. For example, UAV 100 may include four wings 102, four booms 104, and more or less propulsion units (horizontal or vertical).

Figure 1B:
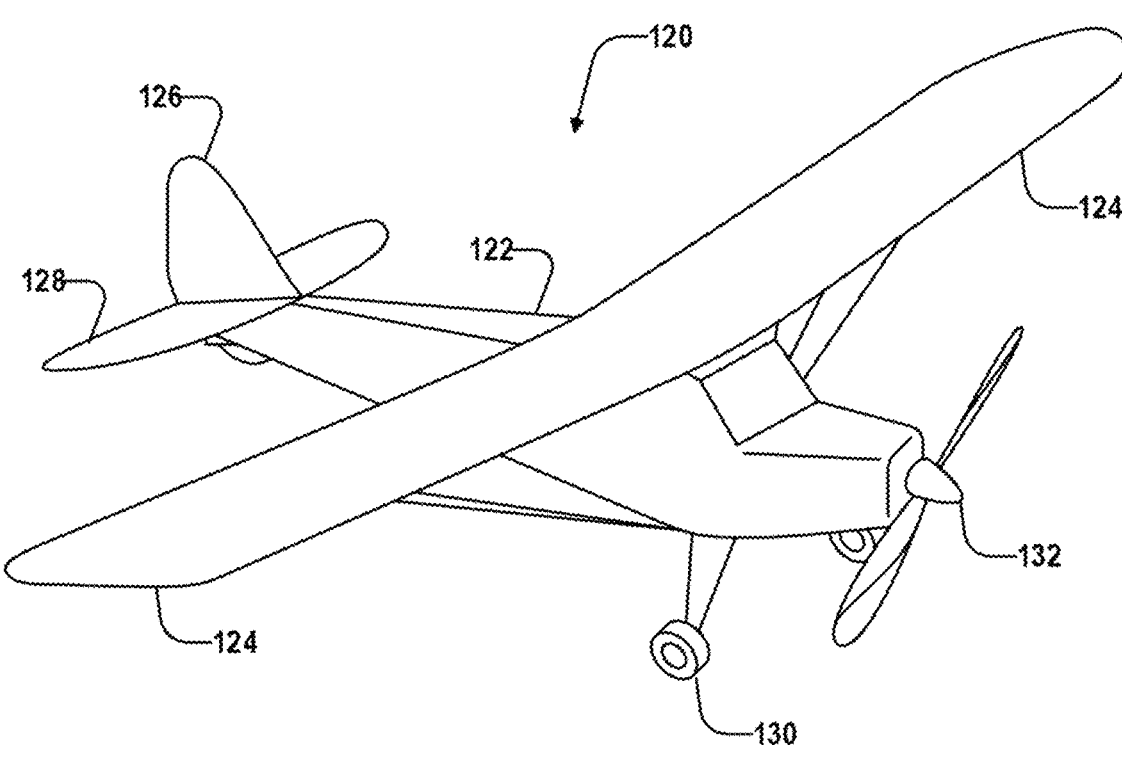
FIG. 1B is a simplified illustration of an unmanned aerial vehicle, according to an example embodiment.

Similarly, FIG. 1B shows another example of a fixed-wing UAV 120. The fixed-wing UAV 120 includes a fuselage 122, two wings 124 with an airfoil-shaped cross section to provide lift for the UAV 120, a vertical stabilizer 126 (or fin) to stabilize the plane's yaw (turn left or right), a horizontal stabilizer 128 (also referred to as an elevator or tailplane) to stabilize pitch (tilt up or down), landing gear 130, and a propulsion unit 132, which can include a motor, shaft, and propeller.

Figure 1C:
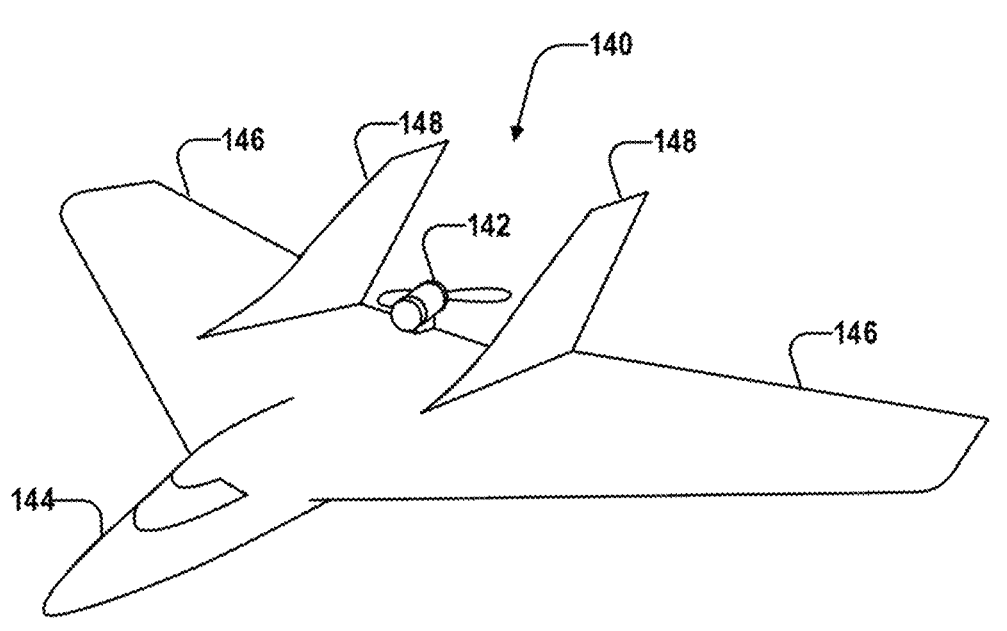
FIG. 1C is a simplified illustration of an unmanned aerial vehicle, according to an example embodiment.

FIG. 1C shows an example of a UAV 140 with a propeller in a pusher configuration. The term "pusher" refers to the fact that a propulsion unit 142 is mounted at the back of the UAV and "pushes" the vehicle forward, in contrast to the propulsion unit being mounted at the front of the UAV. Similar to the description provided for FIGS. 1A and 1B, FIG. 1C depicts common structures used in a pusher plane, including a fuselage 144, two wings 146, vertical stabilizers 148, and the propulsion unit 142, which can include a motor, shaft, and propeller.

Figure 1D:
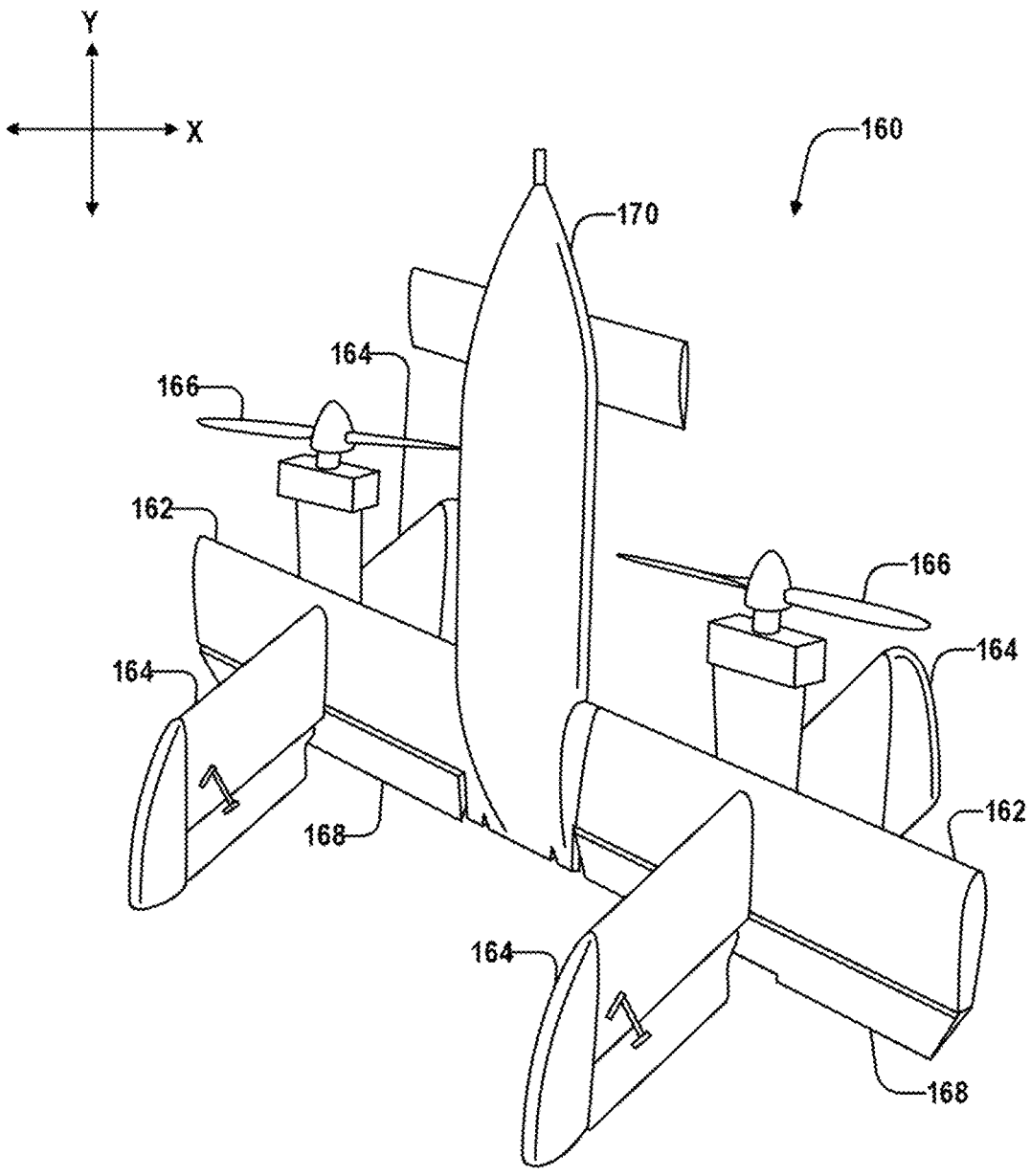
FIG. 1D is a simplified illustration of an unmanned aerial vehicle, according to an example embodiment.

FIG. 1D shows an example of a tail-sitter UAV 160. In the illustrated example, the tail-sitter UAV 160 has fixed wings 162 to provide lift and allow the UAV 160 to glide horizontally (e.g., along the x-axis, in a position that is approximately perpendicular to the position shown in FIG. 1D). However, the fixed wings 162 also allow the tail-sitter UAV 160 to take off and land vertically on its own.

For example, at a launch site, the tail-sitter UAV 160 may be positioned vertically (as shown) with its fins 164 and/or wings 162 resting on the ground and stabilizing the UAV 160 in the vertical position. The tail-sitter UAV 160 may then take off by operating its propellers 166 to generate an upward thrust (e.g., a thrust that is generally along the y-axis). Once at a suitable altitude, the tail-sitter UAV 160 may use its flaps 168 to reorient itself in a horizontal position, such that its fuselage 170 is closer to being aligned with the x-axis than the y-axis. Positioned horizontally, the propellers 166 may provide forward thrust so that the tail-sitter UAV 160 can fly in a similar manner as a typical airplane.

Many variations on the illustrated fixed-wing UAVs are possible. For instance, fixed-wing UAVs may include more or fewer propellers, and/or may utilize a ducted fan or multiple ducted fans for propulsion. Further, UAVs with more wings (e.g., an "x-wing" configuration with four wings), with fewer wings, or even with no wings, are also possible.

Figure 1E:
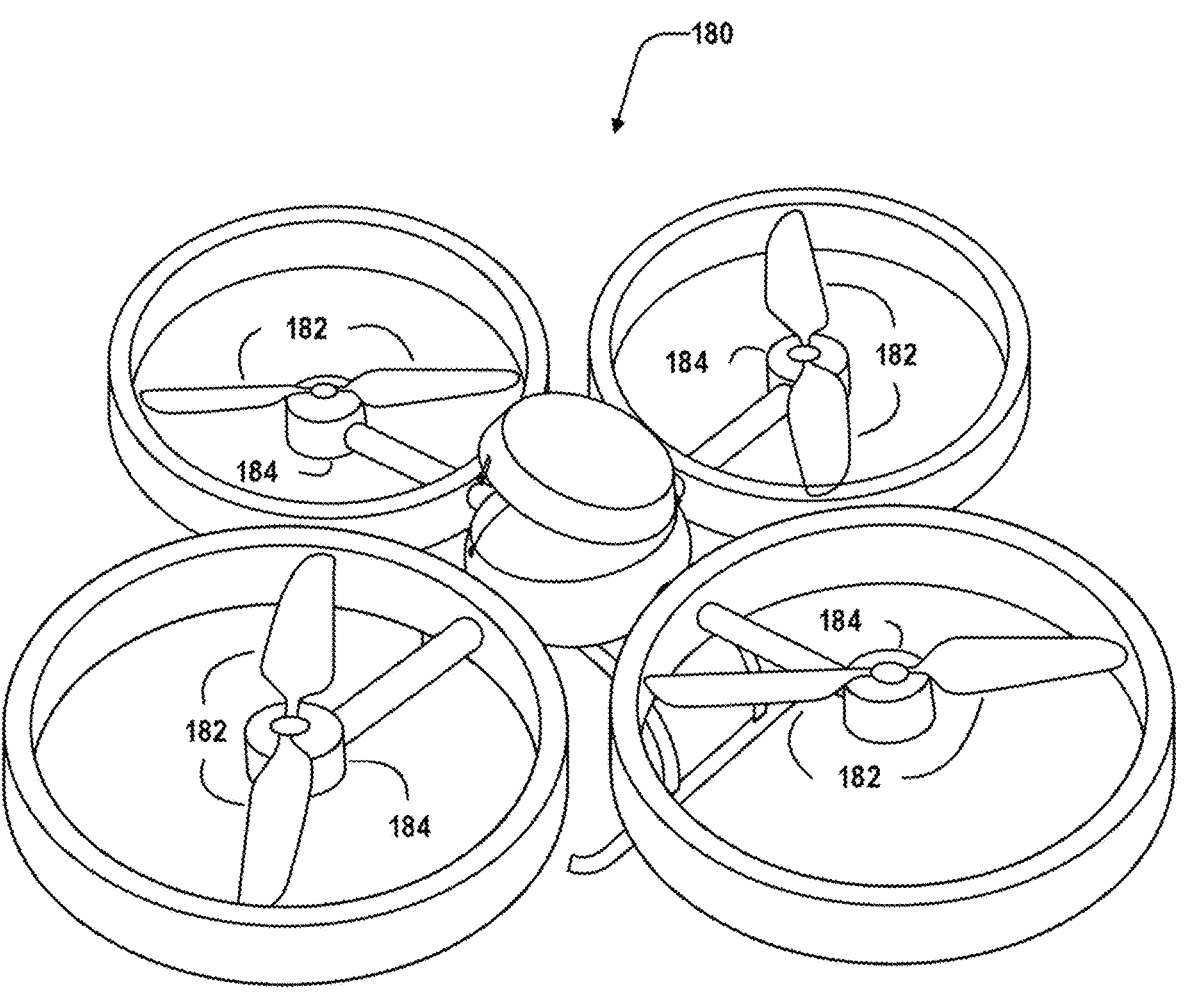
FIG. 1E is a simplified illustration of an unmanned aerial vehicle, according to an example embodiment.

As noted above, some embodiments may involve other types of UAVs, in addition to or in the alternative to fixed-wing UAVs. For instance, FIG. 1E shows an example of a rotorcraft that is commonly referred to as a multicopter 180. The multicopter 180 may also be referred to as a quadcopter, as it includes four rotors 182. It should be understood that example embodiments may involve a rotorcraft with more or fewer rotors than the multicopter 180. For example, a helicopter typically has two rotors. Other examples with three or more rotors are possible as well. Herein, the term "multicopter" refers to any rotorcraft having more than two rotors, and the term "helicopter" refers to rotorcraft having two rotors.

Referring to the multicopter 180 in greater detail, the four rotors 182 provide propulsion and maneuverability for the multicopter 180. More specifically, each rotor 182 includes blades that are attached to a motor 184. Configured as such, the rotors 182 may allow the multicopter 180 to take off and land vertically, to maneuver in any direction, and/or to hover. Further, the pitch of the blades may be adjusted as a group and/or differentially, and may allow the multicopter 180 to control its pitch, roll, yaw, and/or altitude.

It should be understood that references herein to an "unmanned" aerial vehicle or UAV can apply equally to autonomous and semi-autonomous aerial vehicles. In an autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

More generally, it should be understood that the example UAVs described herein are not intended to be limiting. Example embodiments may relate to, be implemented within, or take the form of any type of unmanned aerial vehicle.

III. Illustrative UAV Components

Figure 2:
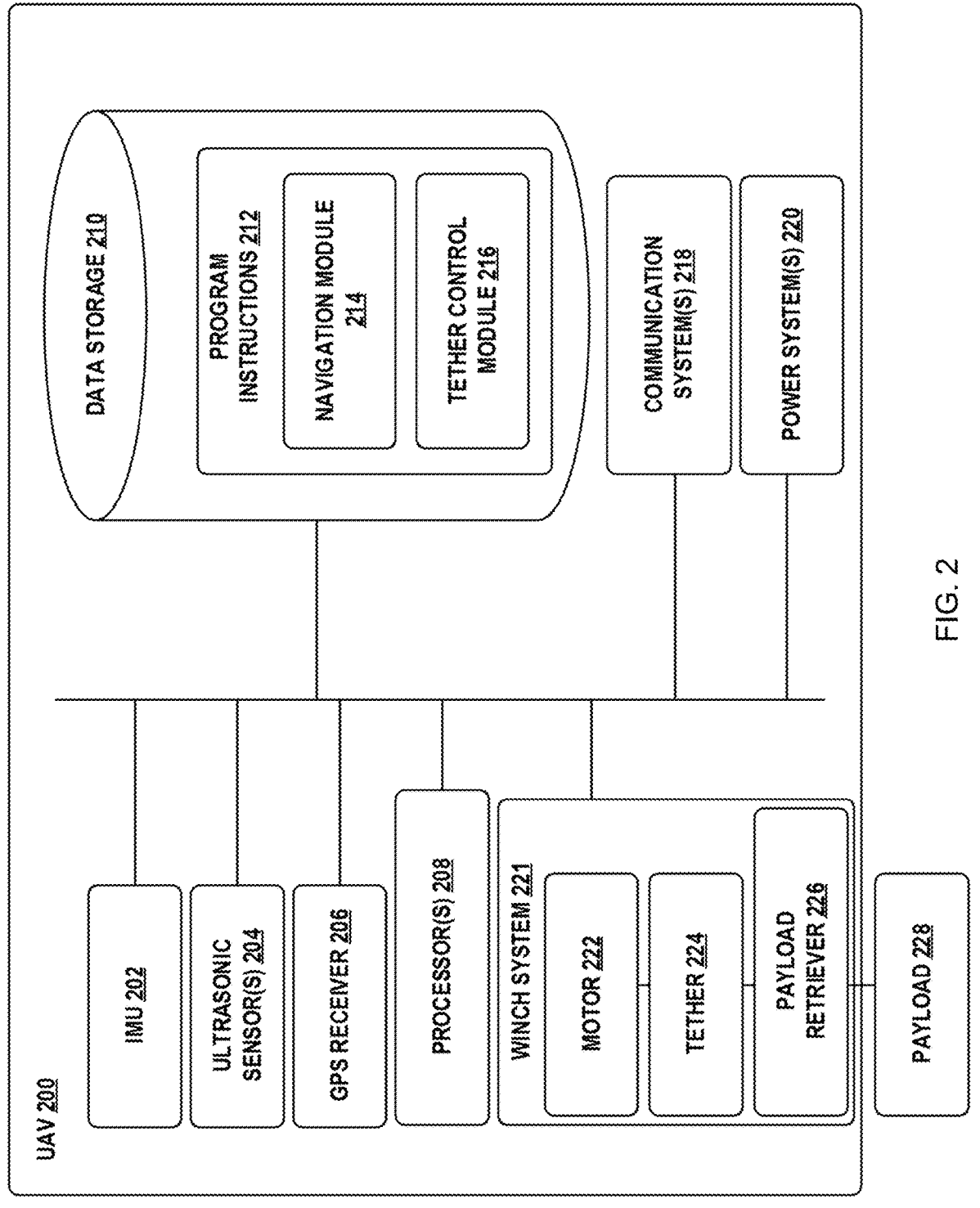
FIG. 2 is a simplified block diagram illustrating components of an unmanned aerial vehicle, according to an example embodiment.

FIG. 2 is a simplified block diagram illustrating components of a UAV 200, according to an example embodiment. UAV 200 may take the form of, or be similar in form to, one of the UAVs 100, 120, 140, 160, and 180 described in reference to FIGS. 1A-1E. However, UAV 200 may also take other forms.

UAV 200 may include various types of sensors, and may include a computing system configured to provide the functionality described herein. In the illustrated embodiment, the sensors of UAV 200 include an inertial measurement unit (IMU) 202, ultrasonic sensor(s) 204, and a GPS 206, among other possible sensors and sensing systems.

In the illustrated embodiment, UAV 200 also includes one or more processors 208. A processor 208 may be a general-purpose processor or a special purpose processor (e.g., digital signal processors, application specific integrated circuits, etc.). The one or more processors 208 can be configured to execute computer-readable program instructions 212 that are stored in the data storage 210 and are executable to provide the functionality of a UAV described herein.

The data storage 210 may include or take the form of one or more computer-readable storage media that can be read or accessed by at least one processor 208. The one or more computer-readable storage media can include volatile and/or non-volatile storage components, such as optical, magnetic, organic or other memory or disc storage, which can be integrated in whole or in part with at least one of the one or more processors 208. In some embodiments, the data storage 210 can be implemented using a single physical device (e.g., one optical, magnetic, organic or other memory or disc storage unit), while in other embodiments, the data storage 210 can be implemented using two or more physical devices.

As noted, the data storage 210 can include computer-readable program instructions 212 and perhaps additional data, such as diagnostic data of the UAV 200. As such, the data storage 210 may include program instructions 212 to perform or facilitate some or all of the UAV functionality described herein. For instance, in the illustrated embodiment, program instructions 212 include a navigation module 214 and a tether control module 216.

A. Sensors

In an illustrative embodiment, IMU 202 may include both an accelerometer and a gyroscope, which may be used together to determine an orientation of the UAV 200. In particular, the accelerometer can measure the orientation of the vehicle with respect to earth, while the gyroscope measures the rate of rotation around an axis. IMUs are commercially available in low-cost, low-power packages. For instance, an IMU 202 may take the form of or include a miniaturized MicroElectroMechanical System (MEMS) or a NanoElectroMechanical System (NEMS). Other types of IMUs may also be utilized.

An IMU 202 may include other sensors, in addition to accelerometers and gyroscopes, which may help to better determine position and/or help to increase autonomy of the UAV 200. Two examples of such sensors are magnetometers and pressure sensors. In some embodiments, a UAV may include a low-power, digital 3-axis magnetometer, which can be used to realize an orientation independent electronic compass for accurate heading information. However, other types of magnetometers may be utilized as well. Other examples are also possible. Further, note that a UAV could include some or all of the above-described inertia sensors as separate components from an IMU.

UAV 200 may also include a pressure sensor or barometer, which can be used to determine the altitude of the UAV 200. Alternatively, other sensors, such as sonic altimeters or radar altimeters, can be used to provide an indication of altitude, which may help to improve the accuracy of and/or prevent drift of an IMU.

In a further aspect, UAV 200 may include one or more sensors that allow the UAV to sense objects in the environment. For instance, in the illustrated embodiment, UAV 200 includes ultrasonic sensor(s) 204. Ultrasonic sensor(s) 204 can determine the distance to an object by generating sound waves and determining the time interval between transmission of the wave and receiving the corresponding echo off an object. A typical application of an ultrasonic sensor for unmanned vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LA-DAR) system, and/or an infrared or forward-looking infrared (FLIR) system, among other possibilities.

In some embodiments, UAV 200 may also include one or more imaging system(s). For example, one or more still and/or video cameras may be utilized by UAV 200 to capture image data from the UAV's environment. As a specific example, charge-coupled device (CCD) cameras or complementary metal-oxide-semiconductor (CMOS) cameras can be used with unmanned vehicles. Such imaging sensor(s) have numerous possible applications, such as obstacle avoidance, localization techniques, ground tracking for more accurate navigation (e.g., by applying optical flow techniques to images), video feedback, and/or image recognition and processing, among other possibilities.

UAV 200 may also include a GPS receiver 206. The GPS receiver 206 may be configured to provide data that is typical of well-known GPS systems, such as the GPS coordinates of the UAV 200. Such GPS data may be utilized by the UAV 200 for various functions. As such, the UAV may use its GPS receiver 206 to help navigate to the caller's location, as indicated, at least in part, by the GPS coordinates provided by their mobile device. Other examples are also possible.

B. Navigation and Location Determination

The navigation module 214 may provide functionality that allows the UAV 200 to, e.g., move about its environment and reach a desired location. To do so, the navigation module 214 may control the altitude and/or direction of flight by controlling the mechanical features of the UAV that affect flight (e.g., its rudder(s), elevator(s), aileron(s), and/or the speed of its propeller(s)).

In order to navigate the UAV 200 to a target location, the navigation module 214 may implement various navigation techniques, such as map-based navigation and localization-based navigation, for instance. With map-based navigation, the UAV 200 may be provided with a map of its environment, which may then be used to navigate to a particular location on the map. With localization-based navigation, the UAV 200 may be capable of navigating in an unknown environment using localization. Localization-based navigation may involve the UAV 200 building its own map of its environment and calculating its position within the map and/or the position of objects in the environment. For example, as a UAV 200 moves throughout its environment, the UAV 200 may continuously use localization to update its map of the environment. This continuous mapping process may be referred to as simultaneous localization and mapping (SLAM). Other navigation techniques may also be utilized.

In some embodiments, the navigation module 214 may navigate using a technique that relies on waypoints. In particular, waypoints are sets of coordinates that identify points in physical space. For instance, an air-navigation waypoint may be defined by a certain latitude, longitude, and altitude. Accordingly, navigation module 214 may cause UAV 200 to move from waypoint to waypoint, in order to ultimately travel to a final destination (e.g., a final waypoint in a sequence of waypoints).

In a further aspect, the navigation module 214 and/or other components and systems of the UAV 200 may be configured for "localization" to more precisely navigate to the scene of a target location. More specifically, it may be desirable in certain situations for a UAV to be within a threshold distance of the target location where a payload 228 is being delivered by a UAV (e.g., within a few feet of the target destination). To this end, a UAV may use a two-tiered approach in which it uses a more-general location-determination technique to navigate to a general area that is associated with the target location, and then use a more-refined location-determination technique to identify and/or navigate to the target location within the general area.

For example, the UAV 200 may navigate to the general area of a target destination where a payload 228 is being delivered using waypoints and/or map-based navigation. The UAV may then switch to a mode in which it utilizes a localization process to locate and travel to a more specific location. For instance, if the UAV 200 is to deliver a payload to a user's home, the UAV 200 may need to be substantially close to the target location in order to avoid delivery of the payload to undesired areas (e.g., onto a roof, into a pool, onto a neighbor's property, etc.). However, a GPS signal may only get the UAV 200 so far (e.g., within a block of the user's home). A more precise location-determination technique may then be used to find the specific target location.

Various types of location-determination techniques may be used to accomplish localization of the target delivery location once the UAV 200 has navigated to the general area of the target delivery location. For instance, the UAV 200 may be equipped with one or more sensory systems, such as, for example, ultrasonic sensors 204, infrared sensors (not shown), and/or other sensors, which may provide input that the navigation module 214 utilizes to navigate autonomously or semi-autonomously to the specific target location.

As another example, once the UAV 200 reaches the general area of the target delivery location (or of a moving subject such as a person or their mobile device), the UAV 200 may switch to a "fly-by-wire" mode where it is controlled, at least in part, by a remote operator, who can navigate the UAV 200 to the specific target location. To this end, sensory data from the UAV 200 may be sent to the remote operator to assist them in navigating the UAV 200 to the specific location.

As yet another example, the UAV 200 may include a module that is able to signal to a passer-by for assistance in either reaching the specific target delivery location; for example, the UAV 200 may display a visual message requesting such assistance in a graphic display, play an audio message or tone through speakers to indicate the need for such assistance, among other possibilities. Such a visual or audio message might indicate that assistance is needed in delivering the UAV 200 to a particular person or a particular location, and might provide information to assist the passer-by in delivering the UAV 200 to the person or location (e.g., a description or picture of the person or location, and/or the person or location's name), among other possibilities. Such a feature can be useful in a scenario in which the UAV is unable to use sensory functions or another location-determination technique to reach the specific target location. However, this feature is not limited to such scenarios.

In some embodiments, once the UAV 200 arrives at the general area of a target delivery location, the UAV 200 may utilize a beacon from a user's remote device (e.g., the user's mobile phone) to locate the person. Such a beacon may take various forms. As an example, consider the scenario where a remote device, such as the mobile phone of a person who requested a UAV delivery, is able to send out directional signals (e.g., via an RF signal, a light signal and/or an audio signal). In this scenario, the UAV 200 may be configured to navigate by "sourcing" such directional signals—in other words, by determining where the signal is strongest and navigating accordingly. As another example, a mobile device can emit a frequency, either in the human range or outside the human range, and the UAV 200 can listen for that frequency and navigate accordingly. As a related example, if the UAV 200 is listening for spoken commands, then the UAV 200 could utilize spoken statements, such as "I'm over here!" to source the specific location of the person requesting delivery of a payload.

In an alternative arrangement, a navigation module may be implemented at a remote computing device, which communicates wirelessly with the UAV 200. The remote computing device may receive data indicating the operational state of the UAV 200, sensor data from the UAV 200 that allows it to assess the environmental conditions being experienced by the UAV 200, and/or location information for the UAV 200. Provided with such information, the remote computing device may determine latitudinal and/or directional adjustments that should be made by the UAV 200 and/or may determine how the UAV 200 should adjust its mechanical features (e.g., its rudder(s), elevator(s), aileron(s), and/or the speed of its propeller(s)) in order to effectuate such movements. The remote computing system may then communicate such adjustments to the UAV 200 so it can move in the determined manner.

C. Communication Systems

In a further aspect, the UAV 200 includes one or more communication systems 218. The communications systems 218 may include one or more wireless interfaces and/or one or more wireline interfaces, which allow the UAV 200 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In some embodiments, a UAV 200 may include communication systems 218 that allow for both short-range communication and long-range communication. For example, the UAV 200 may be configured for short-range communications using Bluetooth and for long-range communications under a CDMA protocol. In such an embodiment, the UAV 200 may be configured to function as a "hot spot" or in other words, as a gateway or proxy between a remote support device and one or more data networks, such as a cellular network and/or the Internet. Configured as such, the UAV 200 may facilitate data communications that the remote support device would otherwise be unable to perform by itself.

For example, the UAV 200 may provide a WiFi connection to a remote device, and serve as a proxy or gateway to a cellular service provider's data network, which the UAV might connect to under an LTE or a 3G protocol, for instance. The UAV 200 could also serve as a proxy or gateway to a high-altitude balloon network, a satellite network, or a combination of these networks, among others, which a remote device might not be able to otherwise access.

D. Power Systems

In a further aspect, the UAV 200 may include power system(s) 220. The power system 220 may include one or more batteries for providing power to the UAV 200. In one example, the one or more batteries may be rechargeable and each battery may be recharged via a wired connection between the battery and a power supply and/or via a wireless charging system, such as an inductive charging system that applies an external time-varying magnetic field to an internal battery.

E. Payload Delivery

The UAV 200 may employ various systems and configurations in order to transport and deliver a payload 228. In some implementations, the payload 228 of a given UAV 200 may include or take the form of a "package" designed to transport various goods to a target delivery location. For example, the UAV 200 can include a compartment, in which an item or items may be transported. Such a package may include one or more food items, purchased goods, medical items, or any other object(s) having a size and weight suitable to be transported between two locations by the UAV. In other embodiments, a payload 228 may simply be the one or more items that are being delivered (e.g., without any package housing the items).

In some embodiments, the payload 228 may be attached to the UAV and located substantially outside of the UAV during some or all of a flight by the UAV. For example, the package may be tethered or otherwise releasably attached below the UAV during flight to a target location. In some embodiments, the package may include various features that protect its contents from the environment, reduce aerodynamic drag on the system, and prevent the contents of the package from shifting during UAV flight. In other embodiments, the package may be a standard shipping package that is not specifically tailored for UAV flight.

In order to deliver the payload, the UAV may include a winch system 221 controlled by the tether control module 216 in order to lower the payload 228 to the ground while the UAV hovers above. As shown in FIG. 2, the winch system 221 may include a tether 224, and the tether 224 may be coupled to the payload 228 by a payload retriever 226. The tether 224 may be wound on a spool that is coupled to a motor 222 of the UAV. The motor 222 may take the form of a DC motor (e.g., a servo motor) that can be actively controlled by a speed controller. The tether control module 216 can control the speed controller to cause the motor 222 to rotate the spool, thereby unwinding or retracting the tether 224 and lowering or raising the payload retriever 226. In practice, the speed controller may output a desired operating rate (e.g., a desired RPM) for the spool, which may correspond to the speed at which the tether 224 and payload 228 should be lowered towards the ground. The motor 222 may then rotate the spool so that it maintains the desired operating rate.

In order to control the motor 222 via the speed controller, the tether control module 216 may receive data from a speed sensor (e.g., an encoder) configured to convert a mechanical position to a representative analog or digital signal. In particular, the speed sensor may include a rotary encoder that may provide information related to rotary position (and/or rotary movement) of a shaft of the motor or the spool coupled to the motor, among other possibilities. Moreover, the speed sensor may take the form of an absolute encoder and/or an incremental encoder, among others. So in an example implementation, as the motor 222 causes rotation of the spool, a rotary encoder may be used to measure this rotation. In doing so, the rotary encoder may be used to convert a rotary position to an analog or digital electronic signal used by the tether control module 216 to determine the amount of rotation of the spool from a fixed reference angle and/or to an analog or digital electronic signal that is representative of a new rotary position, among other options. Other examples are also possible.

Based on the data from the speed sensor, the tether control module 216 may determine a rotational speed of the motor 222 and/or the spool and responsively control the motor 222 (e.g., by increasing or decreasing an electrical current supplied to the motor 222) to cause the rotational speed of the motor 222 to match a desired speed. When adjusting the motor current, the magnitude of the current adjustment may be based on a proportional-integral-derivative (PID) calculation using the determined and desired speeds of the motor 222. For instance, the magnitude of the current adjustment may be based on a present difference, a past difference (based on accumulated error over time), and a future difference (based on current rates of change) between the determined and desired speeds of the spool.

In some embodiments, the tether control module 216 may vary the rate at which the tether 224 and payload 228 are lowered to the ground. For example, the speed controller may change the desired operating rate according to a variable deployment-rate profile and/or in response to other factors in order to change the rate at which the payload 228 descends toward the ground. To do so, the tether control module 216 may adjust an amount of braking or an amount of friction that is applied to the tether 224. For example, to vary the tether deployment rate, the UAV 200 may include friction pads that can apply a variable amount of pressure to the tether 224. As another example, the UAV 200 can include a motorized braking system that varies the rate at which the spool lets out the tether 224. Such a braking system may take the form of an electromechanical system in which the motor 222 operates to slow the rate at which the spool lets out the tether 224. Further, the motor 222 may vary the amount by which it adjusts the speed (e.g., the RPM) of the spool, and thus may vary the deployment rate of the tether 224. Other examples are also possible.

In some embodiments, the tether control module 216 may be configured to limit the motor current supplied to the motor 222 to a maximum value. With such a limit placed on the motor current, there may be situations where the motor 222 cannot operate at the desired operate specified by the speed controller. For instance, as discussed in more detail below, there may be situations where the speed controller specifies a desired operating rate at which the motor 222 should retract the tether 224 toward the UAV 200, but the motor current may be limited such that a large enough downward force on the tether 224 would counteract the retracting force of the motor 222 and cause the tether 224 to unwind instead. And as further discussed below, a limit on the motor current may be imposed and/or altered depending on an operational state of the UAV 200.

In some embodiments, the tether control module 216 may be configured to determine a status of the tether 224 and/or the payload 228 based on the amount of current supplied to the motor 222. For instance, if a downward force is applied to the tether 224 (e.g., if the payload 228 is attached to the tether 224 or if the tether 224 gets snagged on an object when retracting toward the UAV 200), the tether control module 216 may need to increase the motor current in order to cause the determined rotational speed of the motor 222 and/or spool to match the desired speed. Similarly, when the downward force is removed from the tether 224 (e.g., upon delivery of the payload 228 or removal of a tether snag), the tether control module 216 may need to decrease the motor current in order to cause the determined rotational speed of the motor 222 and/or spool to match the desired speed. As such, the tether control module 216 may be configured to monitor the current supplied to the motor 222. For instance, the tether control module 216 could determine the motor current based on sensor data received from a current sensor of the motor or a current sensor of the power system 220. In any case, based on the current supplied to the motor 222, determine if the payload 228 is attached to the tether 224, if someone or something is pulling on the tether 224, and/or if the payload retriever 226 is pressing against the UAV 200 after retracting the tether 224. Other examples are possible as well.

During delivery of the payload 228, the payload retriever 226 can be configured to secure the payload 228 while being lowered from the UAV by the tether 224, and can be further configured to release the payload 228 upon reaching ground level. The payload retriever 226 can then be retracted to the UAV by reeling in the tether 224 using the motor 222.

In some implementations, the payload 228 may be passively released once it is lowered to the ground. For example, a passive release mechanism may include one or more swing arms adapted to retract into and extend from a housing. An extended swing arm may form a hook on which the payload 228 may be attached. Upon lowering the release mechanism and the payload 228 to the ground via a tether, a gravitational force as well as a downward inertial force on the release mechanism may cause the payload 228 to detach from the hook allowing the release mechanism to be raised upwards toward the UAV. The release mechanism may further include a spring mechanism that biases the swing arm to retract into the housing when there are no other external forces on the swing arm. For instance, a spring may exert a force on the swing arm that pushes or pulls the swing arm toward the housing such that the swing arm retracts into the housing once the weight of the payload 228 no longer forces the swing arm to extend from the housing. Retracting the swing arm into the housing may reduce the likelihood of the release mechanism snagging the payload 228 or other nearby objects when raising the release mechanism toward the UAV upon delivery of the payload 228.

Active payload release mechanisms are also possible. For example, sensors such as a barometric pressure based altimeter and/or accelerometers may help to detect the position of the release mechanism (and the payload) relative to the ground. Data from the sensors can be communicated back to the UAV and/or a control system over a wireless link and used to help in determining when the release mechanism has reached ground level (e.g., by detecting a measurement with the accelerometer that is characteristic of ground impact). In other examples, the UAV may determine that the payload has reached the ground based on a weight sensor detecting a threshold low downward force on the tether and/or based on a threshold low measurement of power drawn by the winch when lowering the payload.

Other systems and techniques for delivering a payload, in addition or in the alternative to a tethered delivery system are also possible. For example, a UAV 200 could include an air-bag drop system or a parachute drop system. Alternatively, a UAV 200 carrying a payload could simply land on the ground at a delivery location. Other examples are also possible.

IV. Illustrative UAV Deployment Systems

Figure 3:
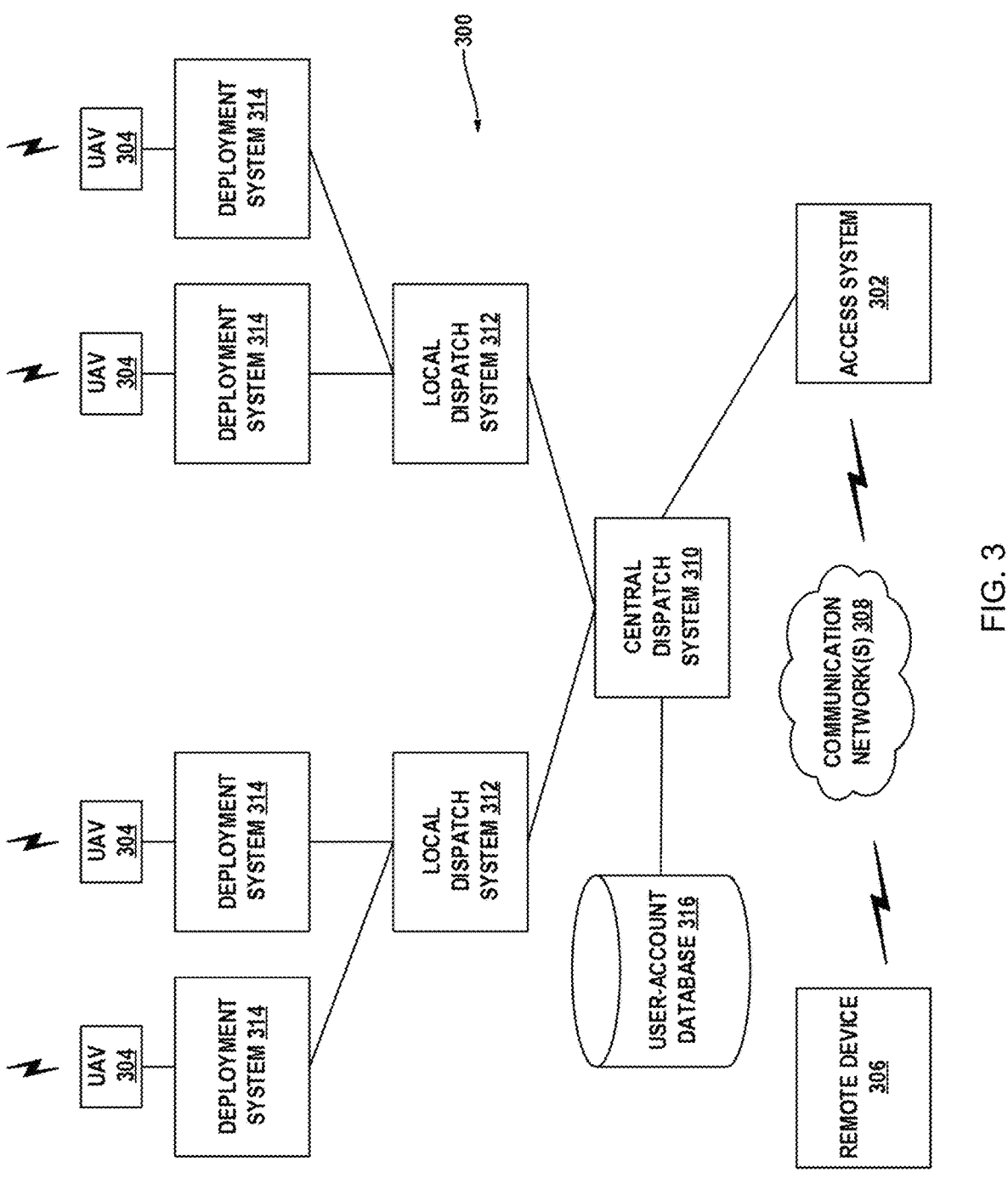
FIG. 3 is a simplified block diagram illustrating a UAV system, according to an example embodiment.

UAV systems may be implemented in order to provide various UAV-related services. In particular, UAVs may be provided at a number of different launch sites that may be in communication with regional and/or central control systems. Such a distributed UAV system may allow UAVs to be quickly deployed to provide services across a large geographic area (e.g., that is much larger than the flight range of any single UAV). For example, UAVs capable of carrying payloads may be distributed at a number of launch sites across a large geographic area (possibly even throughout an entire country, or even worldwide), in order to provide on-demand transport of various items to locations throughout the geographic area. FIG. 3 is a simplified block diagram illustrating a distributed UAV system 300, according to an example embodiment.

In the illustrative UAV system 300, an access system 302 may allow for interaction with, control of, and/or utilization of a network of UAVs 304. In some embodiments, an access system 302 may be a computing system that allows for human-controlled dispatch of UAVs 304. As such, the control system may include or otherwise provide a user interface through which a user can access and/or control the UAVs 304.

In some embodiments, dispatch of the UAVs 304 may additionally or alternatively be accomplished via one or more automated processes. For instance, the access system 302 may dispatch one of the UAVs 304 to transport a payload to a target location, and the UAV may autonomously navigate to the target location by utilizing various on-board sensors, such as a GPS receiver and/or other various navigational sensors.

Further, the access system 302 may provide for remote operation of a UAV. For instance, the access system 302 may allow an operator to control the flight of a UAV via its user interface. As a specific example, an operator may use the access system 302 to dispatch a UAV 304 to a target location. The UAV 304 may then autonomously navigate to the general area of the target location. At this point, the operator may use the access system 302 to take control of the UAV 304 and navigate the UAV to the target location (e.g., to a particular person to whom a payload is being transported). Other examples of remote operation of a UAV are also possible.

In an illustrative embodiment, the UAVs 304 may take various forms. For example, each of the UAVs 304 may be a UAV such as those illustrated in FIGS. 1A-1E. However, UAV system 300 may also utilize other types of UAVs without departing from the scope of the invention. In some implementations, all of the UAVs 304 may be of the same or a similar configuration. However, in other implementations, the UAVs 304 may include a number of different types of UAVs. For instance, the UAVs 304 may include a number of types of UAVs, with each type of UAV being configured for a different type or types of payload delivery capabilities.

The UAV system 300 may further include a remote device 306, which may take various forms. Generally, the remote device 306 may be any device through which a direct or indirect request to dispatch a UAV can be made. (Note that an indirect request may involve any communication that may be responded to by dispatching a UAV, such as requesting a package delivery). In an example embodiment, the remote device 306 may be a mobile phone, tablet computer, laptop computer, personal computer, or any network-connected computing device. Further, in some instances, the remote device 306 may not be a computing device. As an example, a standard telephone, which allows for communication via plain old telephone service (POTS), may serve as the remote device 306. Other types of remote devices are also possible.

Further, the remote device 306 may be configured to communicate with access system 302 via one or more types of communication network(s) 308. For example, the remote device 306 may communicate with the access system 302 (or a human operator of the access system 302) by communicating over a POTS network, a cellular network, and/or a data network such as the Internet. Other types of networks may also be utilized.

In some embodiments, the remote device 306 may be configured to allow a user to request delivery of one or more items to a desired location. For example, a user could request UAV delivery of a package to their home via their mobile phone, tablet, or laptop. As another example, a user could request dynamic delivery to wherever they are located at the time of delivery. To provide such dynamic delivery, the UAV system 300 may receive location information (e.g., GPS coordinates, etc.) from the user's mobile phone, or any other device on the user's person, such that a UAV can navigate to the user's location (as indicated by their mobile phone).

In an illustrative arrangement, the central dispatch system 310 may be a server or group of servers, which is configured to receive dispatch messages requests and/or dispatch instructions from the access system 302. Such dispatch messages may request or instruct the central dispatch system 310 to coordinate the deployment of UAVs to various target locations. The central dispatch system 310 may be further configured to route such requests or instructions to one or more local dispatch systems 312. To provide such function- ality, the central dispatch system 310 may communicate with the access system 302 via a data network, such as the Internet or a private network that is established for commu- nications between access systems and automated dispatch systems.

In the illustrated configuration, the central dispatch sys- tem 310 may be configured to coordinate the dispatch of UAVs 304 from a number of different local dispatch systems 312. As such, the central dispatch system 310 may keep track of which UAVs 304 are located at which local dispatch systems 312, which UAVs 304 are currently available for deployment, and/or which services or operations each of the UAVs 304 is configured for (in the event that a UAV fleet includes multiple types of UAVs configured for different services and/or operations). Additionally or alternatively, each local dispatch system 312 may be configured to track which of its associated UAVs 304 are currently available for deployment and/or are currently in the midst of item trans- port.

In some cases, when the central dispatch system 310 receives a request for UAV-related service (e.g., transport of an item) from the access system 302, the central dispatch system 310 may select a specific UAV 304 to dispatch. The central dispatch system 310 may accordingly instruct the local dispatch system 312 that is associated with the selected UAV to dispatch the selected UAV. The local dispatch system 312 may then operate its associated deployment system 314 to launch the selected UAV. In other cases, the central dispatch system 310 may forward a request for a UAV-related service to a local dispatch system 312 that is near the location where the support is requested and leave the selection of a particular UAV 304 to the local dispatch system 312.

In an example configuration, the local dispatch system 312 may be implemented as a computing system at the same location as the deployment system(s) 314 that it controls. For example, the local dispatch system 312 may be imple- mented by a computing system installed at a building, such as a warehouse, where the deployment system(s) 314 and UAV(s) 304 that are associated with the particular local dispatch system 312 are also located. In other embodiments, the local dispatch system 312 may be implemented at a location that is remote to its associated deployment system(s) 314 and UAV(s) 304.

Numerous variations on and alternatives to the illustrated configuration of the UAV system 300 are possible. For example, in some embodiments, a user of the remote device 306 could request delivery of a package directly from the central dispatch system 310. To do so, an application may be implemented on the remote device 306 that allows the user to provide information regarding a requested delivery, and generate and send a data message to request that the UAV system 300 provide the delivery. In such an embodiment, the central dispatch system 310 may include automated func- tionality to handle requests that are generated by such an application, evaluate such requests, and, if appropriate, coordinate with an appropriate local dispatch system 312 to deploy a UAV.

Further, some or all of the functionality that is attributed herein to the central dispatch system 310, the local dispatch system(s) 312, the access system 302, and/or the deployment system(s) 314 may be combined in a single system, imple- mented in a more complex system, and/or redistributed among the central dispatch system 310, the local dispatch system(s) 312, the access system 302, and/or the deployment system(s) 314 in various ways.

Yet further, while each local dispatch system 312 is shown as having two associated deployment systems 314, a given local dispatch system 312 may alternatively have more or fewer associated deployment systems 314. Similarly, while the central dispatch system 310 is shown as being in communication with two local dispatch systems 312, the central dispatch system 310 may alternatively be in com- munication with more or fewer local dispatch systems 312.

In a further aspect, the deployment systems 314 may take various forms. In general, the deployment systems 314 may take the form of or include systems for physically launching one or more of the UAVs 304. Such launch systems may include features that provide for an automated UAV launch and/or features that allow for a human-assisted UAV launch. Further, the deployment systems 314 may each be config- ured to launch one particular UAV 304, or to launch multiple UAVs 304.

The deployment systems 314 may further be configured to provide additional functions, including for example, diag- nostic-related functions such as verifying system function- ality of the UAV, verifying functionality of devices that are housed within a UAV (e.g., a payload delivery apparatus), and/or maintaining devices or other items that are housed in the UAV (e.g., by monitoring a status of a payload such as its temperature, weight, etc.).

In some embodiments, the deployment systems 314 and their corresponding UAVs 304 (and possibly associated local dispatch systems 312) may be strategically distributed throughout an area such as a city. For example, the deploy- ment systems 314 may be strategically distributed such that each deployment system 314 is proximate to one or more payload pickup locations (e.g., near a restaurant, store, or warehouse). However, the deployment systems 314 (and possibly the local dispatch systems 312) may be distributed in other ways, depending upon the particular implementa- tion. As an additional example, kiosks that allow users to transport packages via UAVs may be installed in various locations. Such kiosks may include UAV launch systems, and may allow a user to provide their package for loading onto a UAV and pay for UAV shipping services, among other possibilities. Other examples are also possible.

In a further aspect, the UAV system 300 may include or have access to a user-account database 316. The user- account database 316 may include data for a number of user accounts, and which are each associated with one or more persons. For a given user account, the user-account database 316 may include data related to or useful in providing UAV-related services. Typically, the user data associated with each user account is optionally provided by an asso- ciated user and/or is collected with the associated user's permission.

Further, in some embodiments, a person may be required to register for a user account with the UAV system 300, if they wish to be provided with UAV-related services by the UAVs 304 from UAV system 300. As such, the user-account database 316 may include authorization information for a given user account (e.g., a username and password), and/or other information that may be used to authorize access to a user account.

In some embodiments, a person may associate one or more of their devices with their user account, such that they can access the services of UAV system 300. For example, when a person uses an associated mobile phone, e.g., to place a call to an operator of the access system 302 or send a message requesting a UAV-related service to a dispatch system, the phone may be identified via a unique device identification number, and the call or message may then be attributed to the associated user account. Other examples are also possible.

V. Example Package Coupling Apparatus

Figure 4A:
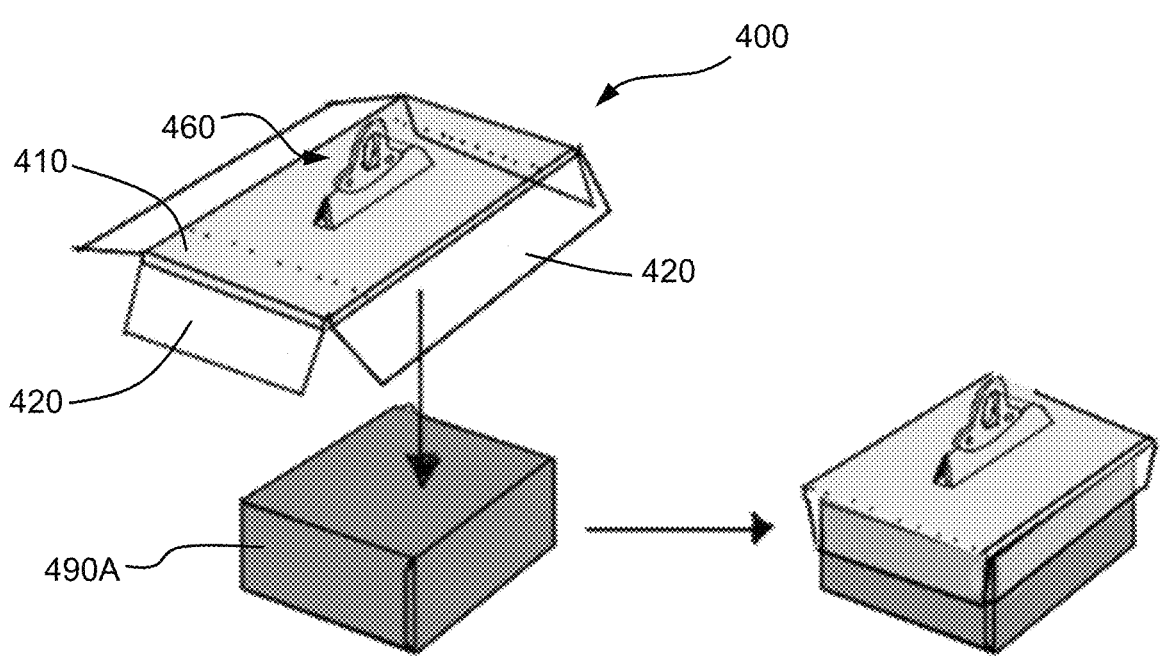
FIG. 4A is a perspective view of an attachment of a package coupling apparatus to a package, according to an example embodiment.
Figure 4B:
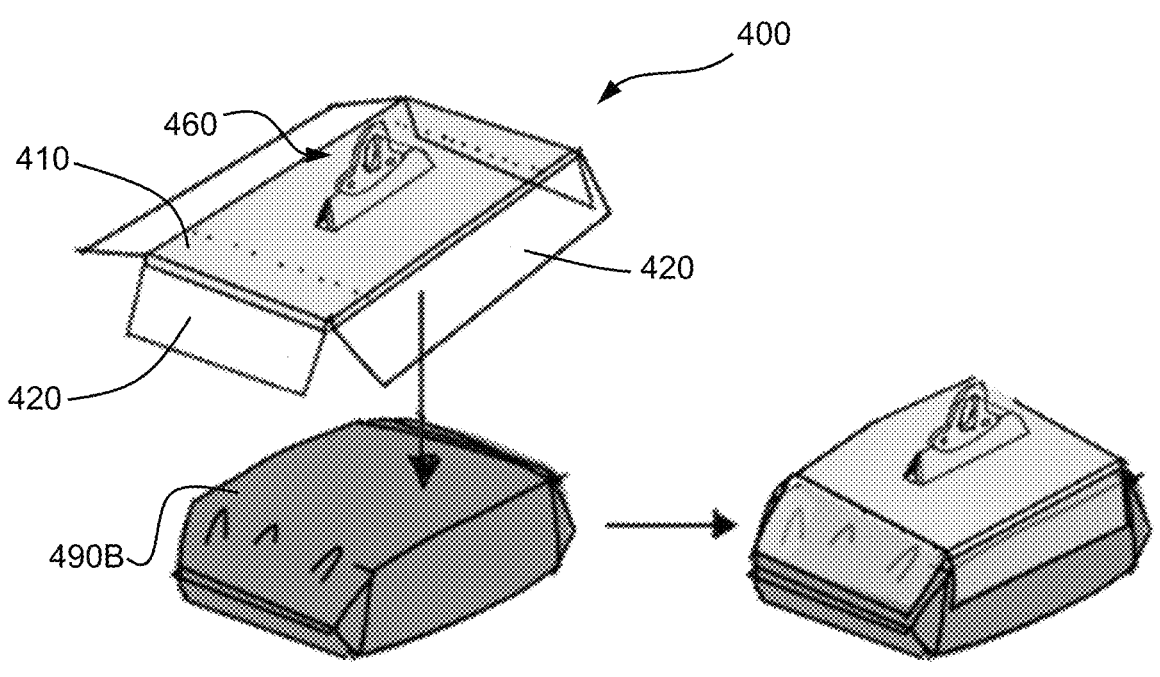
FIG. 4B is a perspective view of an attachment of the package coupling apparatus of FIG. 4A to another package, according to an example embodiment.

When a UAV is assigned to carry a generic package, which may have any of a range of sizes and shapes, a package coupling apparatus according to the disclosure can be utilized to secure the package to the UAV. The package coupling apparatus may be attached to the package and provide a structure that is configured for interacting with components of the UAV in order to secure the package to the UAV. FIGS. 4A and 4B each illustrate the attachment of an example package coupling apparatus 400 to a respective package, where the two packages have different shapes. Package coupling apparatus 400 includes a support plate 410 and a handle 460 extending up from the support plate 410. In the illustrated embodiment, handle 460 is part of a hanger attached to the support plate 410. The handle 460 includes a handle opening and a bridge that extends over the handle opening, as explained further below.

FIG. 4A illustrates the attachment of the package coupling apparatus 400 to a package 490A in the form of a rectangular box. The support plate 410 is placed against the upper side of the box 490A and flaps 420 extending from the support plate 410 are positioned to engage the lateral sides of the box 490A in order to secure the package coupling apparatus 400. With the package coupling apparatus 400 secured to the box 490A, the handle 460 of the package coupling apparatus 400 may be seized by a component of the UAV to secure and/or manipulate the box 490A.

FIG. 4B illustrates the same package coupling apparatus 400 being attached to a package 490B in the form of a pouch. Similar to the attachment of the package coupling apparatus 400 to the box, the support plate 410 is placed against an upper surface of the pouch 490B and flaps 420 of the package coupling apparatus 400 are positioned to surround the sides of the pouch 490B and secure the pouch 490B to the package coupling apparatus 400. Again, with the package coupling apparatus 400 secured to the pouch 490B, the handle 460 can be seized by the UAV.

The support plate 410 may provide several beneficial characteristics to the package coupling apparatus. First, the dimensions of support plate 410 may allow it to extend across a substantial portion of the package on which it is secured. Accordingly, the breadth of the support plate can provide a sizeable attachment interface between the package coupling apparatus 400 and the package, which can increase the strength of the attachment between the package coupling apparatus 400 and the package. The breadth of the support plate 410 may also help hold a larger portion of the package close to the UAV during flight. For example, when the package is the form of a flexible pouch, such as pouch 490B shown in FIG. 4B, any part of the flexible exterior that is not attached to the package coupling apparatus 400 will hang down from the attached portion. By providing a broad surface across the support plate to secure to the pouch, the amount of the pouch that can hang down from the UAV is reduced. For comparison, if a flexible pouch was secured only at a single point on its exterior, the rest of the pouch would hang down from the connection point. In configurations of the UAV where the package will be held below the UAV during flight, reducing the distance that the package hangs below the UAV can help reduce drag caused by the package.

Further, the structural integrity of the support plate 410 may help limit tenting at the top of the package. When a package is supported from above, such as when hung from a UAV, the force at the top of the package can cause the package or a combination of the package and coupling apparatus to deform or bend upward at the attachment point. For example, if the package or coupling apparatus is supported in the middle, the upward force will cause the opposing sides of the package or coupling apparatus to angle upward toward the attachment point thereby causing tenting at the top of the package.

With certain attachment configurations, it may not be possible to entirely avoid tenting at the top of the package. However, limiting the amount of tenting may be desirable. First, tenting at the top of the package results in an increase in the overall height of the package, which, as stated above, increases drag. Moreover, tenting at the top of the package may sometimes even result in damage to the package. For example, in some instances, when the upward bend or tenting at the top of the package is extensive, the sidewalls of the package may collapse inward damaging the package and potentially the contents of the package.

The support plate can help limit tenting by adding strength at the top of the package. For example, the support plate may be configured to maintain a substantially flat shape up to a certain load. Moreover, to add strength to the support plate, it may include certain reinforcements, as explained in more detail below. With the support plate secured to the top of a package, tenting at the top of the package may be limited to a permissible amount that avoids an unwanted downward extension of the package.

Figure 5:
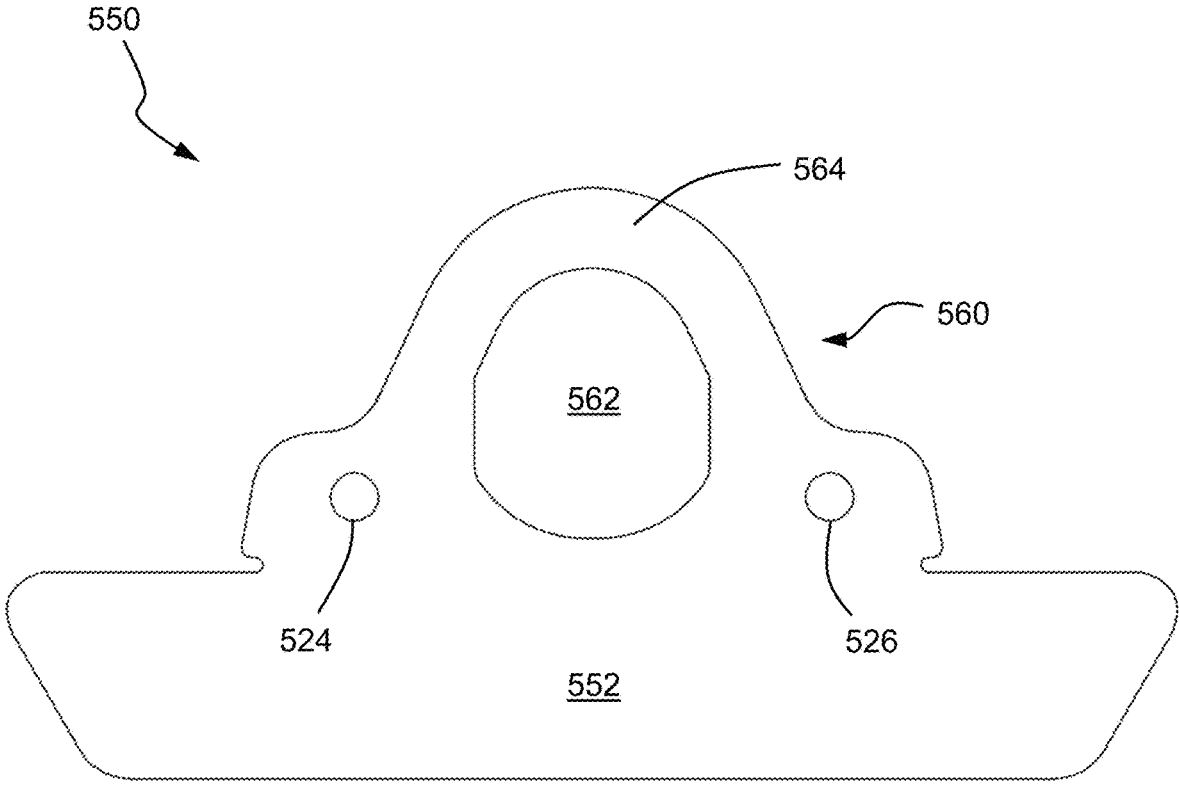
FIG. 5 is a side view of a hanger of a package coupling apparatus, according to an example embodiment.

FIG. 5 is a side view of a hanger 550 configured to be secured to a support plate to form a package coupling apparatus according to an embodiment of the disclosure. The hanger 550 may include a handle 560 formed by a bridge 564 that extends over a handle opening 562. In addition, the hanger 550 may also include a base 552 that extends past the ends of the handle 560 and is configured to couple the hanger 550 to an attachment structure of a support plate. The hanger 550 may also include holes 524, 526 that are configured to receive locking pins for securing the package coupling apparatus and any associated package. For example, the holes 524 and 526 may be configured to receive locking pins positioned within the fuselage of a UAV to secure the hanger 550 and payload in a secure position during high speed forward flight to a delivery location. In addition, holes 524 and 526 may also be designed for pins of a payload holder to extend therethrough to hold the payload in position for retrieval on a payload retrieval apparatus. The hanger may be comprised of a thin, plastic material that is flexible and provides sufficient strength to suspend the payload beneath a UAV during forward flight to a delivery site, and during delivery and/or retrieval of a payload. In practice, the hanger may be bent to position the handle within a slot of a payload retriever.

The example hanger 550 shown in FIG. 5 includes a larger handle opening 562 for a payload retriever and two smaller holes 524, 526 for locking pins, as described in more detail below. In other embodiments, however, the hanger may include fewer or more apertures. For example, in some embodiments, the hanger may include only a single larger handle opening that is sized for a payload retriever. In such a case, a payload retriever may be configured to receive the handle in order to raise and lower a package with respect to a UAV. The payload retriever alone may be used to secure the package to the UAV, or the payload retriever may be used in cooperation with other structures, such as clamps or doors, to secure the package to the UAV. Alternatively, in some embodiments, the handle opening may be sized to receive a locking pin, and the hanger may not include a larger opening for a payload retriever. In such an embodiment, the UAV may be configured to land to receive a package and either land or drop a package for delivery. For example, such an embodiment may have a configuration similar to that of FIG. 5, with two small holes but without the larger opening. Accordingly, either of the holes may form the handle opening and the material extending over the opening may form the bridge of the handle.

Figure 6C:
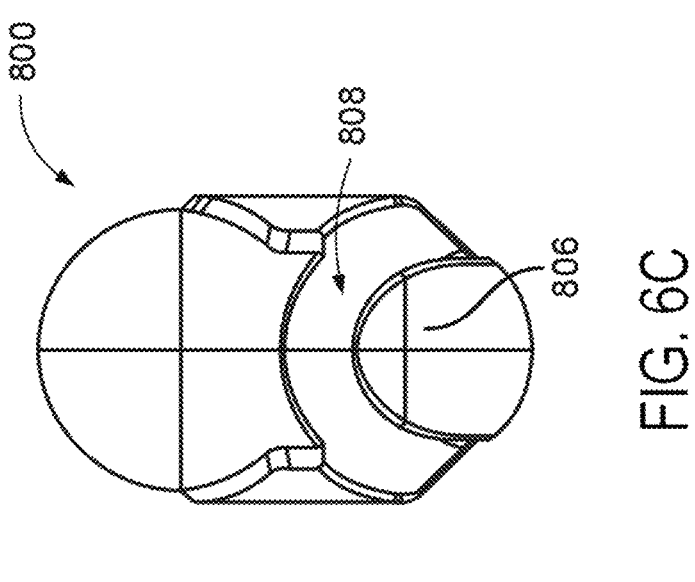
FIG. 6C is a front view of the payload retriever shown in FIGS. 6A and 6B.
Figure 6B:
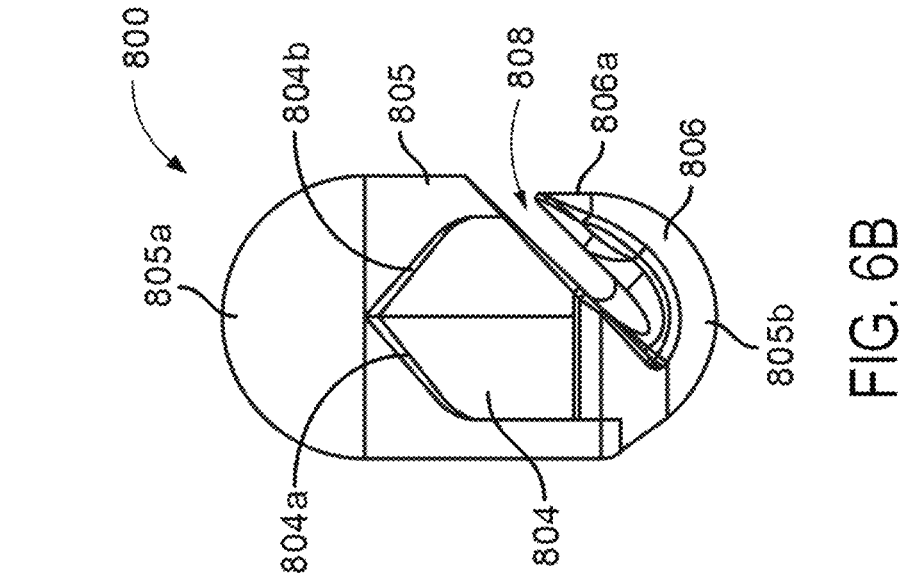
FIG. 6B is a side view of the payload retriever shown in FIG. 6A.
Figure 6A:
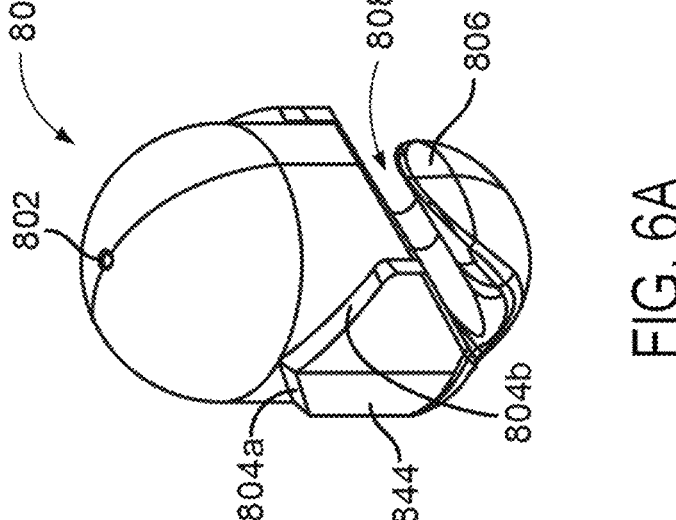
FIG. 6A is a perspective view of a payload retriever, according to an example embodiment.

FIG. 6A is a perspective view of payload retriever 800, according to an example embodiment. Payload retriever 800 includes tether mounting point 802, and a slot 808 to receive a handle of the package coupling apparatus. Lower lip, or hook, 806 is positioned beneath slot 808. Also included is an outer protrusion 804 having helical cam surfaces 804a and 804b that are adapted to mate with corresponding cam mating surfaces within a payload retriever receptacle positioned within a fuselage of a UAV.

FIG. 6B is a side view of payload retriever 800 shown in FIG. 6A. Slot 808 is shown positioned above lower lip, or hook, 806. As shown lower lip or hook 806 has an outer surface 806a that is undercut such that it does not extend as far outwardly as an outer surface above slot 805 so that the lower lip or hook 806 will not reengage with the handle of the package coupling apparatus after it has been decoupled, or will not get engaged with power lines or tree branches during retrieval to the UAV.

FIG. 6C is a front view of payload retriever 800 shown in FIGS. 6A and 6B. Lower lip or hook 806 is shown positioned beneath slot 808 that is adapted for securing a handle of a payload, such as on a package coupling apparatus of the disclosure.

Figure 7A:
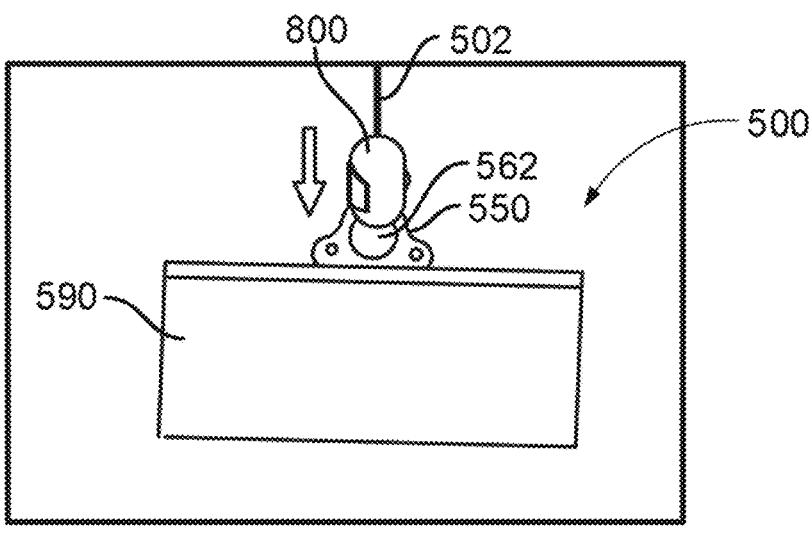
FIGS. 7A-7C show decoupling of a payload retriever from a package coupling apparatus, according to an example embodiment.

FIG. 7A shows a side view of a package coupling apparatus 500 secured to a package 590 with a hanger 550 secured within a payload retriever 800 as the package 590 moves downwardly prior to touching down for delivery. Prior to payload touchdown, the hanger 550 of package coupling apparatus 500 includes a handle opening 562 through which a lower lip or hook of payload coupling apparatus 800 extends. The handle sits within a slot of the payload retriever 800 that is suspended from a tether passing through tether mounting point 802 of payload retriever 800 during descent of the package 590 to a landing site.

Figure 7B:
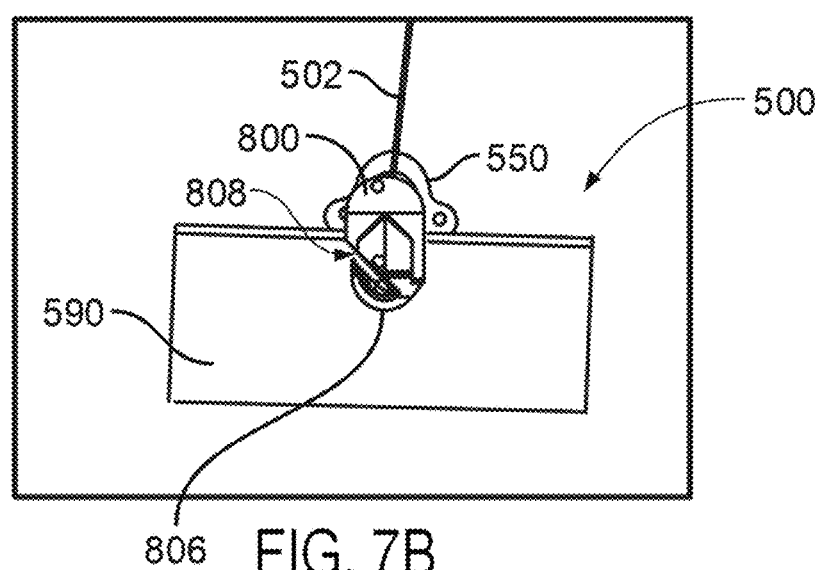

FIG. 7B shows a side view of package coupling apparatus 500 after package 590 has landed on the ground showing payload retriever 800 decoupled from hanger 550 of package coupling apparatus 500. Once the package 590 touches the ground, the payload coupling apparatus 800 continues to move downwardly (as the winch further unwinds) through inertia or gravity and decouples the hanger 550 from the slot 880 of the payload retriever 800 from hanger 550. The payload retriever 800 remains suspended from tether 502, and can be winched back up to the payload coupling receptacle of the UAV.

Figure 7C:
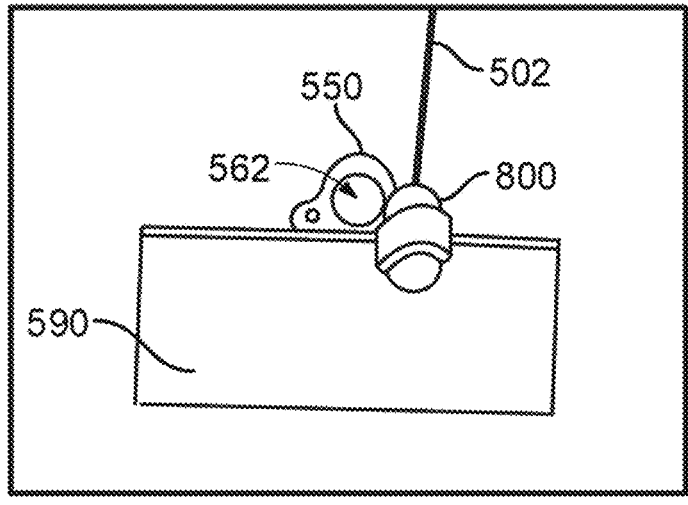

FIG. 7C shows a side view of payload delivery apparatus 500 with payload retriever 800 moving away from hanger 550 of package coupling apparatus 500. Here the payload retriever 800 is completely separated from the handle opening 562 of hanger 550. Tether 502 may be used to winch the payload retriever back to a receptacle positioned in the fuselage of the UAV.

Figure 8:
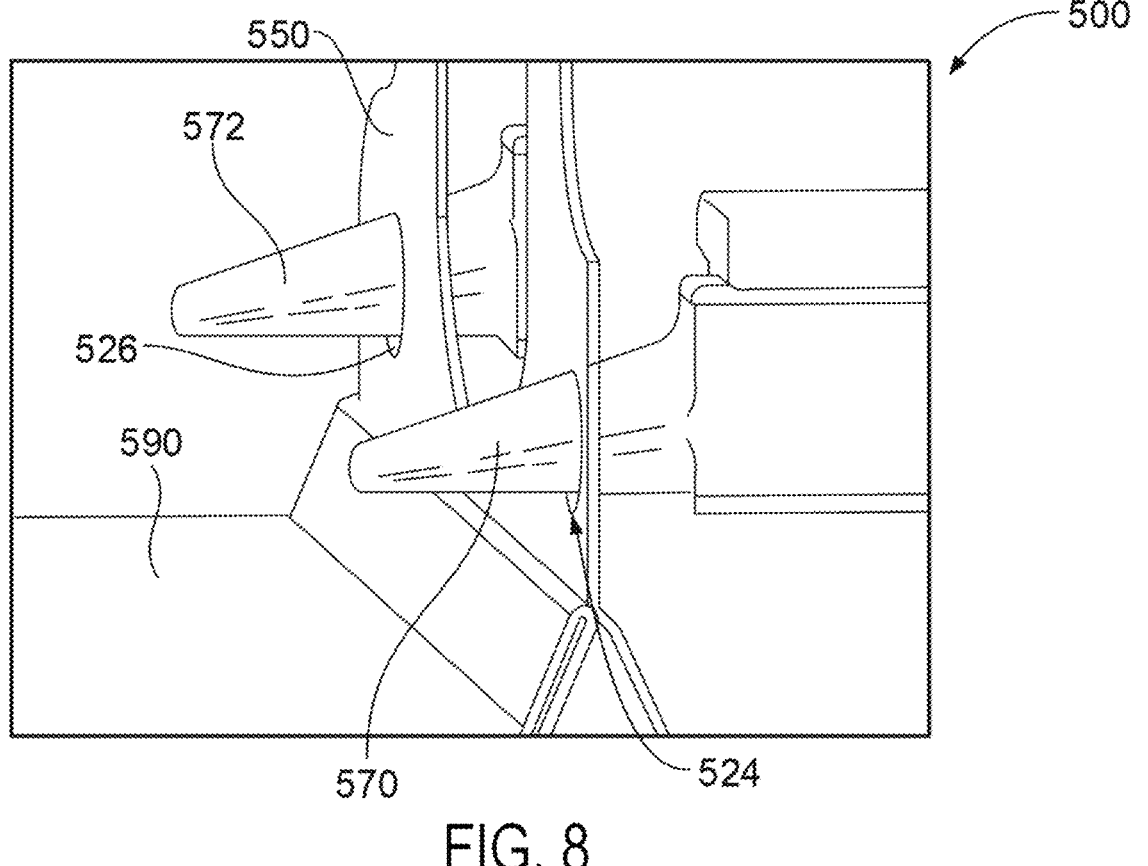
FIG. 8 shows a pair of locking pins extending through a hanger of a package coupling apparatus, according to an example embodiment.

FIG. 8 shows a pair of pins 570, 572 extending through holes 524 and 526 in hanger of package coupling apparatus 500 to secure the hanger 550 and top portion of a package within the fuselage of a UAV, or to secure package 590 to a payload holder of a payload retrieval apparatus. In this manner, the hanger 550 and package 590 may be secured within the fuselage of a UAV, or to a payload holder of a payload retrieval apparatus. In this embodiment, the pins 570 and 572 have a conical shape so that they pull the package up slightly or at least remove any downward slack present. In some embodiments the pins 570 and 572 may completely plug the holes 524 and 526 of the hanger 550 of package 590, to provide a secure attachment of the handle and top portion of the payload within the fuselage of the UAV, or to secure the payload to a payload retrieval apparatus. Although the pins are shown as conical, in other applications they may have other geometries, such as a cylindrical geometry.

FIGS. 9-15 illustrate various examples of package coupling apparatuses in accordance with the disclosure. As shown in FIG. 9A, an example package coupling apparatus 900 includes a support plate 910 and a handle 960 extending up from the support plate 910. The support plate 910 includes an upper surface 916 and a lower surface 917 and has a rectangular configuration with a first end 911, a second end 912, a first lateral side 913, and a second lateral side 914. As shown in FIG. 9B, the handle 960 is part of a hanger 950 that includes a base 952 and the handle 960 extending up from the base 952. The handle 960 is part of a flat tab 966 that is coupled to the center of the base 952 such that opposing sides of the base 952 extend laterally outward from the handle 960. This configuration allows the hanger 950 to be efficiently and securely coupled to the support plate 910 by inserting the tab 966 through a narrow aperture 915 in the support plate 910. The lateral extension of the base 952 prevents the hanger 950 from passing all the way through the aperture 915. Likewise, once the package coupling apparatus 900 is placed on a package 990, as shown in FIG. 9A, the presence of the package 990 will prevent the tab 966 of the hanger 950 from falling back through the aperture 915 and separating from the support plate 910.

While the above description of the connection between the support plate 910 and hanger 950 provides a secure attachment between these components without any additional fasteners or attachment elements, in some embodiments the package coupling apparatus 900 may include additional features to secure the hanger 950 to the support plate 910. For example, the hanger 950 may be secured to the support plate 910 with a layer of adhesive between an upper surface of the base 952 and the lower surface 917 of the support plate 910. Alternatively, or in addition, the base 952 may be secured to the support plate with an adhesive strip, such as tape, that holds the base 952 against the support plate 910. Further still, clips or fasteners may be used to secure the base 952 of the hanger 950 to the support plate 910. While not explicitly mentioned in the following descriptions, these methods of attaching the hanger to the support plate may also be used with other embodiments of the package coupling apparatus, including the other illustrated examples.

Figure 9A:
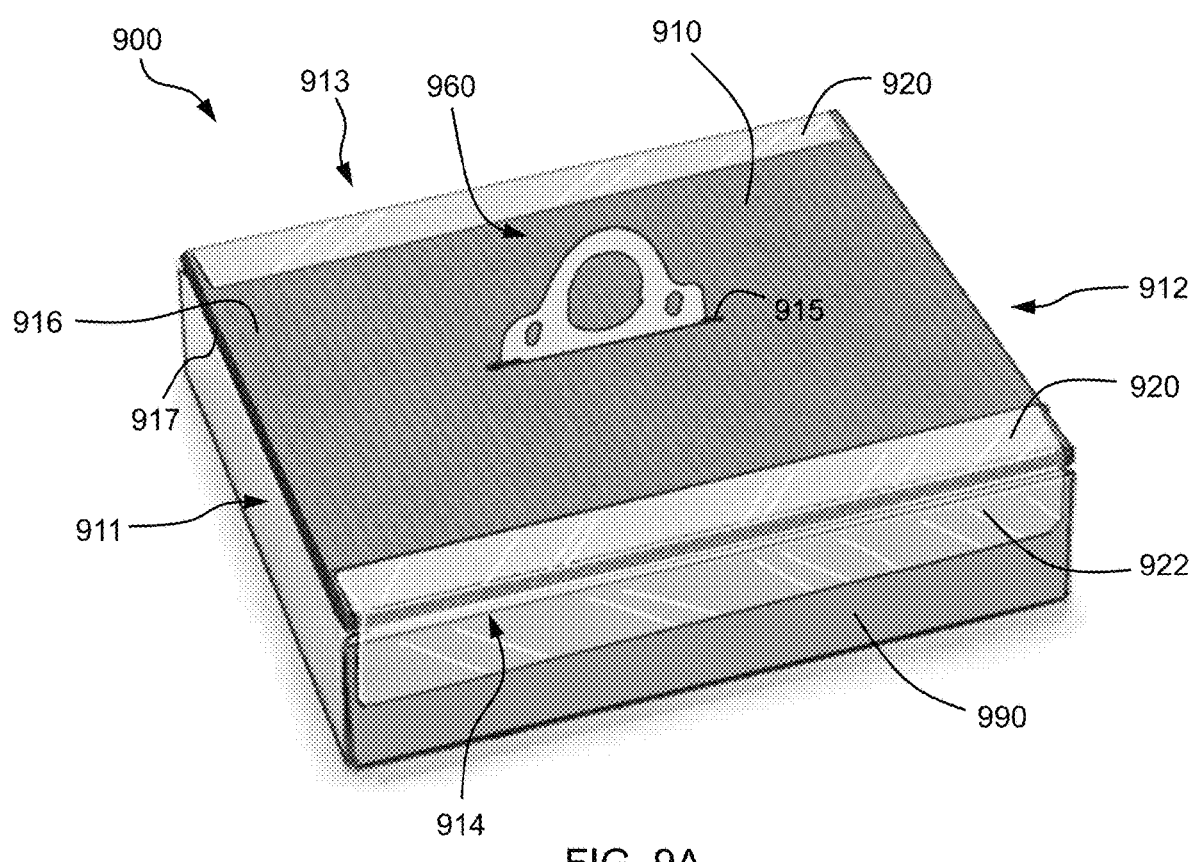
FIG. 9A is a perspective view of a package coupling apparatus attached to a package, according to an example embodiment.
Figure 9B:
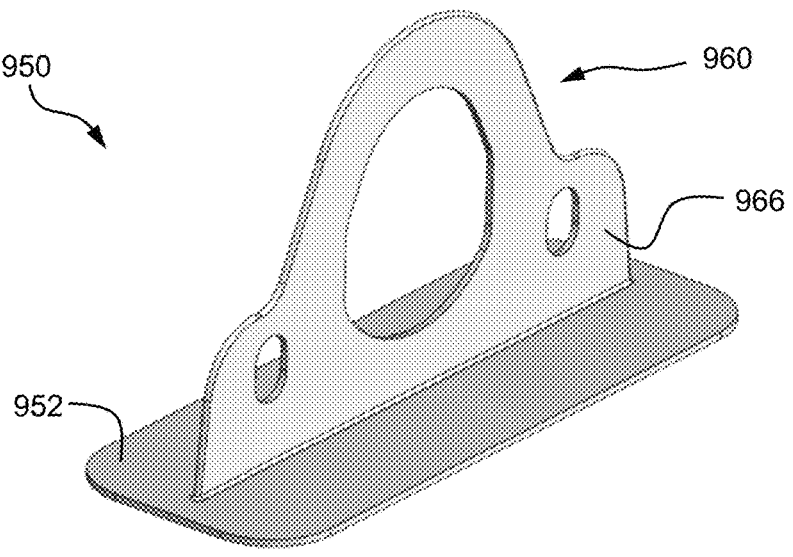
FIG. 9B is a hanger of the package coupling apparatus of FIG. 9A.

FIG. 9A shows the package coupling apparatus 900 secured to the package 990 using two adhesive strips 920 disposed on the first lateral side 913 and the second lateral side 914. The strips 920 are positioned to partially overlap the edge along each lateral side 913, 914 so as to form a flap 922 that extends outward from the respective edges of the support plate 910. The inner surface of the flaps 922 are coated with adhesive so that they may be secured to the package 990, as shown in FIG. 9A.

The illustrated adhesive strips 920 extend along the entire edge of each lateral side 913, 914. Accordingly, the attachment between the support plate 910 and the package 990 extends over the entire length of the respective edges. In other embodiments, however, the adhesive strips 920 may extend over only a portion of the edges of the support plate 910. Moreover, while the adhesive strips 920 in FIG. 9A are arranged so that the flaps 922 are wide but short, in other embodiments, the adhesive strips 920 may be oriented to extend perpendicular to the edge so that the flaps 922 are narrow but long. In such an embodiments, a smaller portion of the edge of the support plate 910 is directly coupled to the package 990, but the flaps 922 are able to extend further around the package 990.

In some embodiments, the flaps 922 formed by the adhesive strips 920 may be applied to the support plate 910 after it has been placed over the package 990, for example by removing the adhesive strips 920 from a roll of tape and applying part of the adhesive strip 920 along the edges of the support plate 910. A second part of each adhesive strip may then be secured to the package 990. In other embodiments, the flaps may be pre-installed on the support plate. Such an embodiment is shown in FIGS. 10A-10C.

Figure 10A:
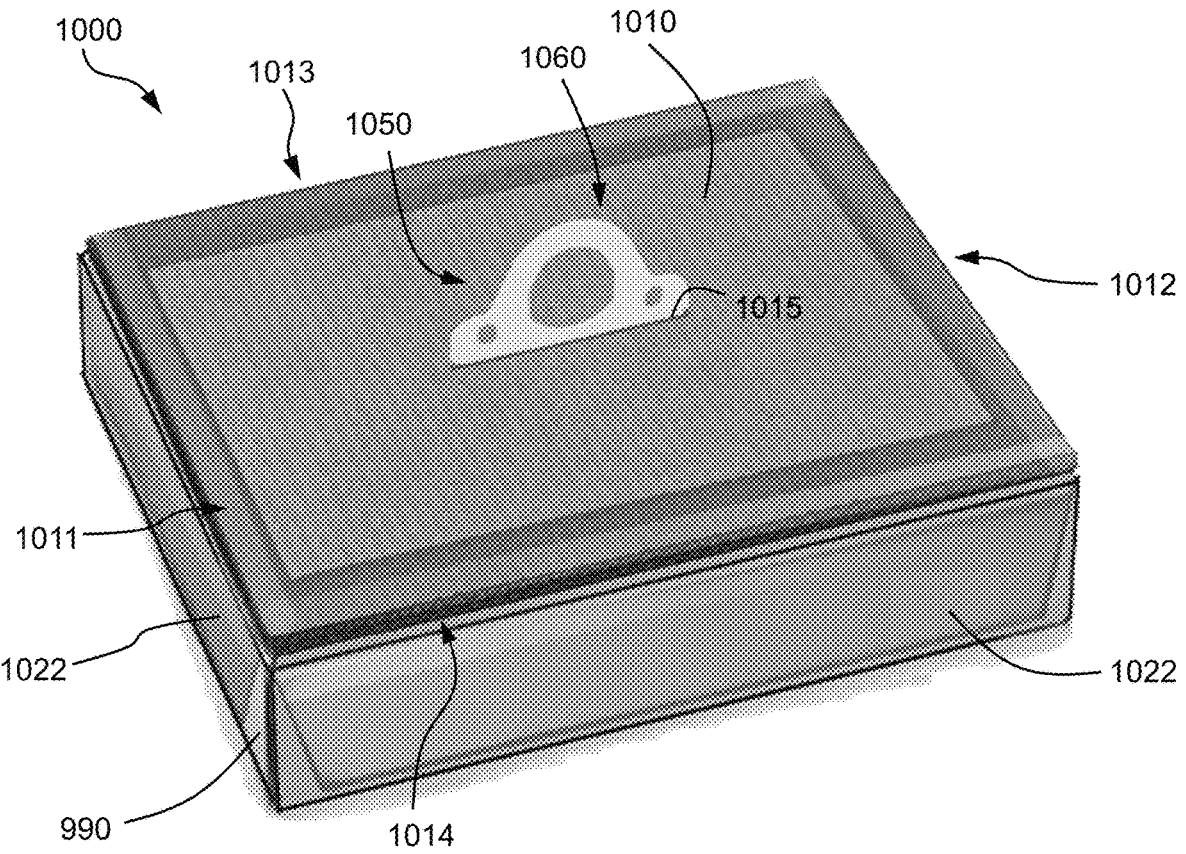
FIG. 10A is a perspective view of a package coupling apparatus attached to a package, according to an example embodiment.
Figures 10B, 10C:
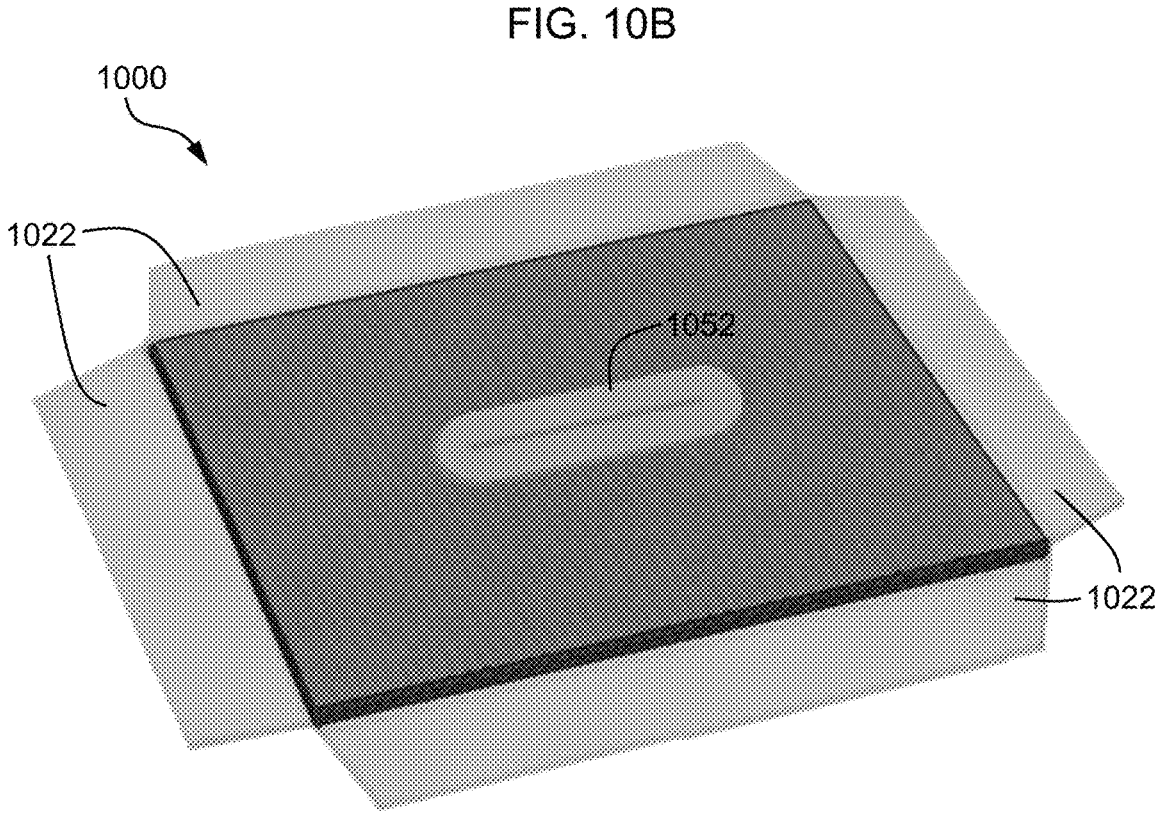
FIG. 10B is a bottom view of the package coupling apparatus of FIG. 10A with a removable backer.
FIG. 10C is a bottom view of the package coupling apparatus of FIGS. 10A and 10B.

FIG. 10A shows another example package coupling apparatus 1000 that includes a support plate 1010 with a first end 1011, a second end 1012, a first lateral side 1013, and a second lateral side 1014. The package coupling apparatus 1000 also includes a handle 1060 that is part of a hanger 1050 that extends through an aperture 1015 in the support plate 1010 and includes a base 1052 positioned underneath the support plate 1010, as shown in FIG. 10C. The support plate 1010 is secured to a package 1090 using a plurality of flaps 1022 that extend outward from the edges of the support plate 1010. In particular, a respective flap 1022 extends outward from each of the first end 1011, the second end 1012, the first lateral side 1013 and the second lateral side 1014. Accordingly, the flaps 1022 can be used secure the support plate 1010 around the entire perimeter of the package 1090.

Each of the flaps 1022 of the package coupling apparatus 1000 may include an adhesive coating on an inner surface thereof. To prevent adhesion of the flaps 1022 prior to engagement with the package 1090, each of the flaps 1022 may include a removable backer strip 1024 that protects the adhesive until it is removed prior to installation on the package 1090.

While adhesive strips that are applied to the support plate at the time of securing the support plate to the package, such as strips of tape, may typically be attached to the upper surface of the support plate, preinstalled adhesive flaps, such as flaps 1022 of package coupling apparatus 1000 may be secured to the upper surface 1016 or lower surface 1017 of the support plate 1010. Further, in some embodiments the flaps 1022 may extend outward from an area between the upper surface and lower surface of the support plate 1010. For example, the support plate may be formed from multiple layers of material and the adhesive flaps 1022 may be secured between the layers.

As illustrated in FIG. 10B, the support plate 1010 may also include a layer of adhesive on at least a portion of its lower surface 1017. For example, the support plate 1010 may include a removable backer strip 1026 that covers the lower surface of the support plate 1010 to protect the layer of adhesive. Accordingly, when the package coupling apparatus 1000 is ready for installation on the package 1090, the backer strip 1026 may be removed and the lower surface 1017 of the support plate 1010 can be adhered to the package 1090. This provides a direct connection between the support plate 1010 and the package 1090 in addition to any other attachments provided by adhesive strips, adhesive flaps, or otherwise. In some embodiments, the layer of adhesive on the support plate 1010 may extend across the entire lower surface 1017 of the support plate 1010. In other embodiments, the layer of adhesive may be provided in a pattern that covers strategic areas of the support plate 1010 for an effective attachment to the package.

In each of FIGS. 9A and 10A, the support plate is the same size as the upper surface of the package. However, embodiments of the package coupling apparatus may be used with packages of various sizes. For example, the adhesive strips or flaps may extend over the sides of packages that are smaller or larger than the support plate. Further, the rectangular configuration of the support plate can accommodate packages of various sizes by rotating the support plate with respect to the package. For example, a smaller package may be oriented so that the length of the package extends from one lateral side of the support plate to the other with only the flaps along the lateral sides being secured to the package. On the other hand, a larger package may be oriented so that the width of the package is aligned with the length of the support plate. In such a case, the flaps at the ends of the support plate may be secured to the lateral sides of the package and the flaps at the sides of the support plate may be secured to the top of the package.

Figure 11:
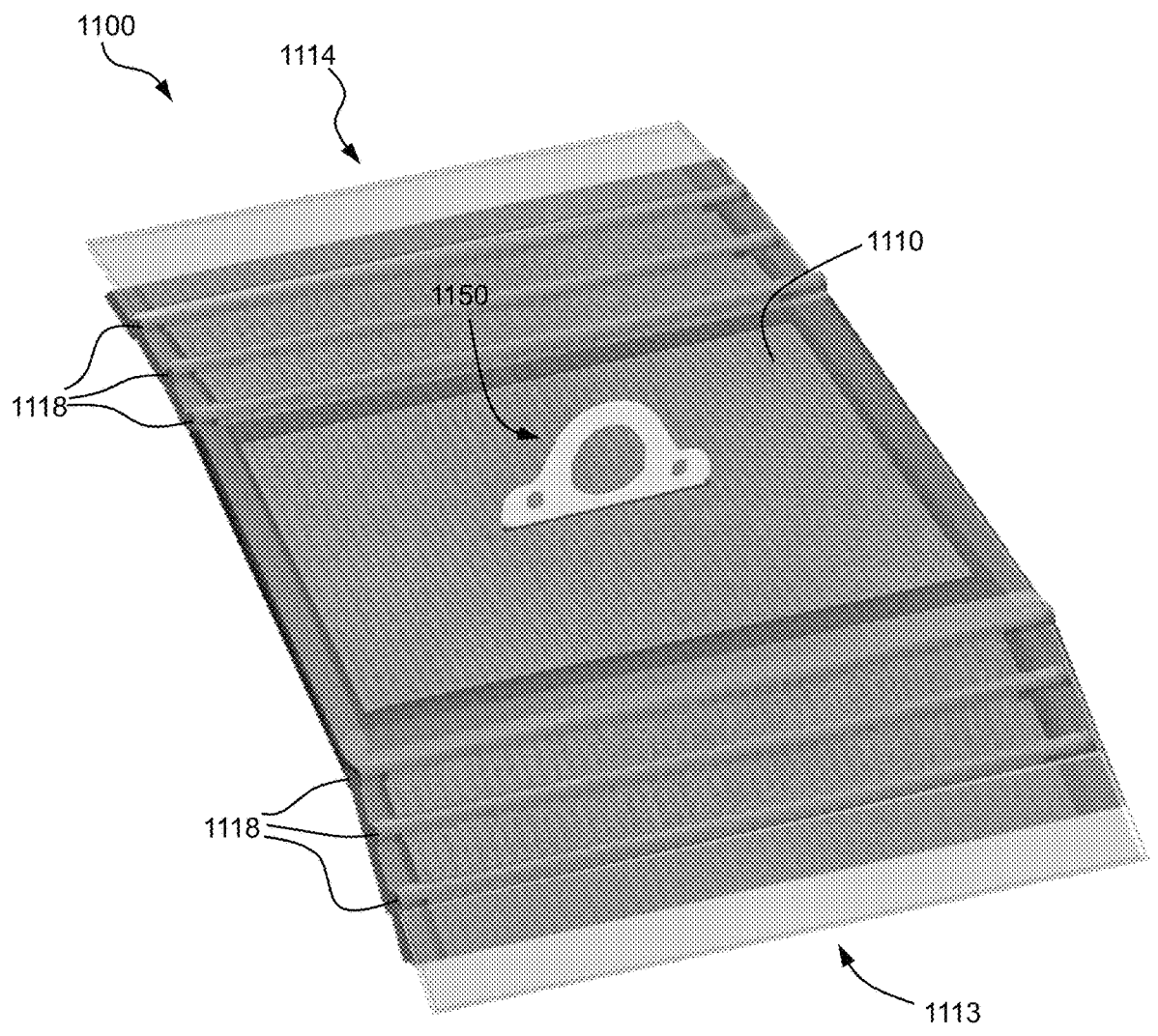
FIG. 11 is a perspective view of a package coupling apparatus, according to an example embodiment.

Alternatively, in some embodiments, the support plate may be configured to adapt to packages of different sizes. FIG. 11 illustrates a package coupling apparatus 1100 that includes a support plate 1110 and a hanger 1150 attached to the support plate 1110. The support plate 1110 may include one or more hinges 1118 along each lateral side 1113, 1114 that allows the sides of the support plate 1110 to fold down from the top surface of a package to cover a portion of the sides of the package. This allows the support plate 1110 shown in FIG. 11 to have a tailored fit to packages of various widths or lengths. The hinges 1118 may be formed by scoring of the material that forms the support plate 1110. For example, the support plate 1110 in the illustrated embodiment is formed of a corrugated cardboard, and the hinges are formed by scoring of the cardboard to allow the lateral sides 1113, 1114 to fold over the upper edges of a package.

In each of the embodiments of FIGS. 9-11, the connection between the support plate and the hanger is formed by a tab of the hanger passing through an aperture in the support plate and a base of the hanger engaging the lower surface of the support plate. In each case, adhesive may be used to secure the hanger to the support plate and prevent removal therefrom. In other embodiments, the connection between the hanger and the support plate may be secured by a mechanical coupling of these components.

Figure 12A:
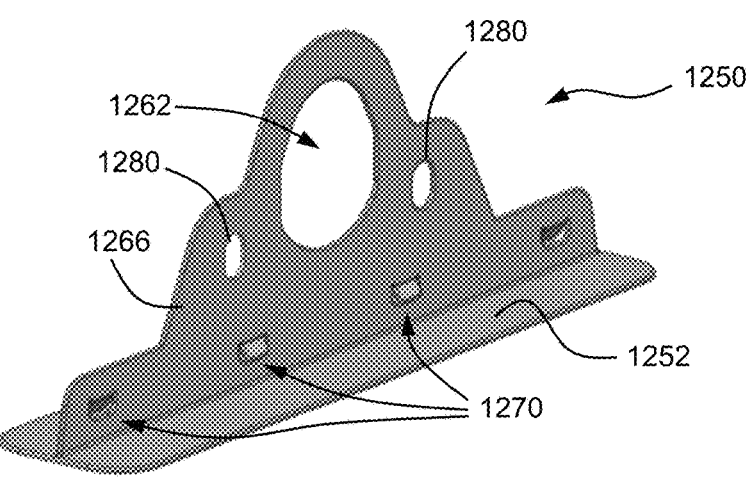
FIG. 12A is a perspective view of a hanger of a package coupling apparatus, according to an example embodiment.
Figure 12B:
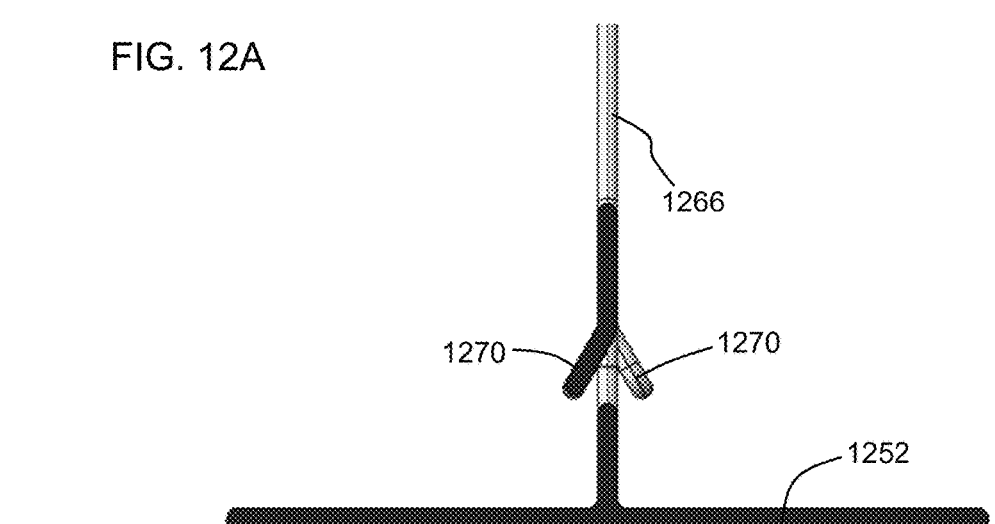
FIG. 12B is a side view of the hanger of FIG. 12A.
Figure 12C:
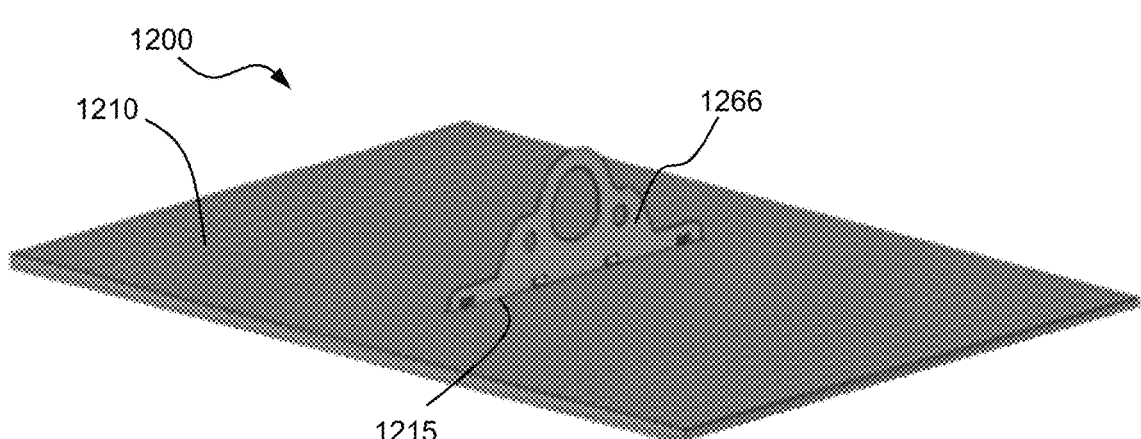
FIG. 12C is a perspective view of the hanger of FIGS. 12A and 12B in a package coupling apparatus, according to an example embodiment.

For example, FIG. 12A illustrates a perspective view of an example embodiment of a hanger 1250 that includes a base 1252 and a tab 1266 that extends up from the base. The tab 1266 may include a handle opening 1262 and locking pin holes 1268, as described further above. The tab 1266 also includes a plurality of catches 1270 that help retain the attachment between the support plate 1210 and hanger 1250. FIG. 12B illustrates a portion of hanger 1250 and more clearly shows that the catches 1270 may be formed as angled projections that extend outward and downward from the flat tab 1266. Accordingly, as the tab is inserted through an aperture 1215 in the surface of the support plate 1210, as shown in the package coupling apparatus 1200 of FIG. 12C, the angled projections 1270 may fold inward allowing the insertion of the hanger 1250 into the aperture 1215 to proceed unimpeded. However, once the angled projections 1270 pass the support plate 1210 they will project outward. As a result, movement of the tab hanger 1250 to disengage from the support plate 1210 may be prevented, as the support plate 1210 may be caught by the angled projections 1270.

Figure 13A:
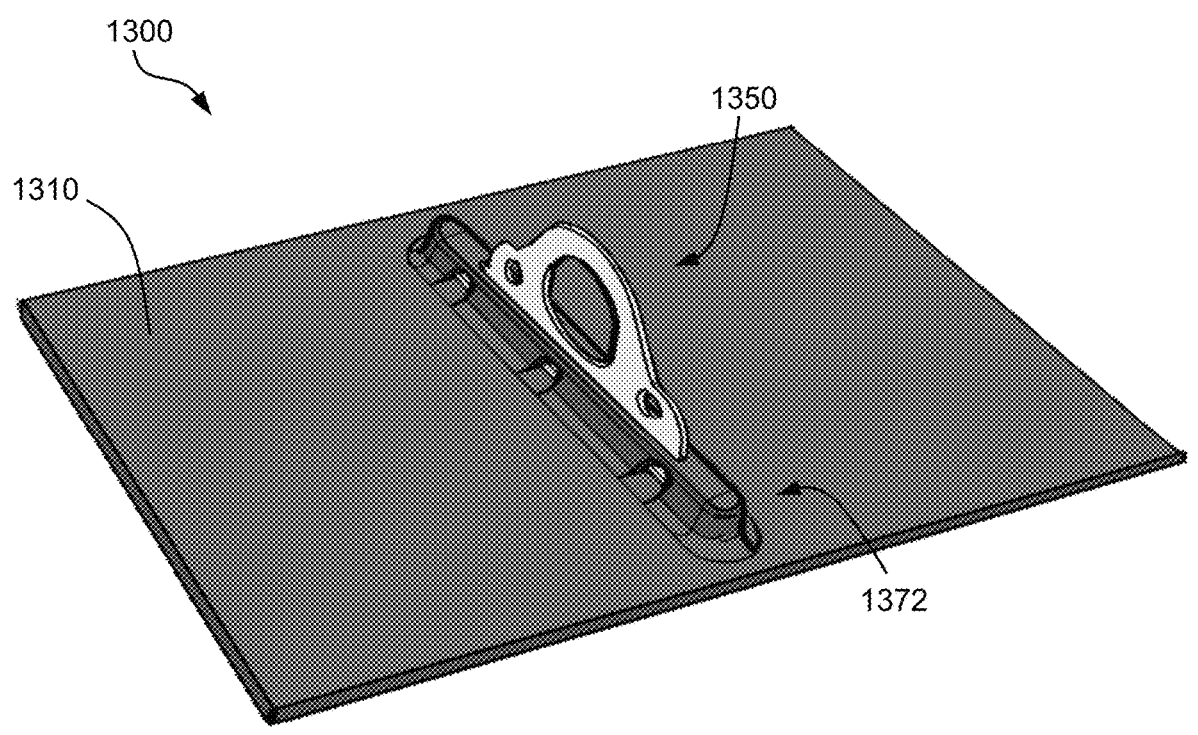
FIG. 13A is a perspective view of a package coupling apparatus, according to an example embodiment.
Figure 13B:
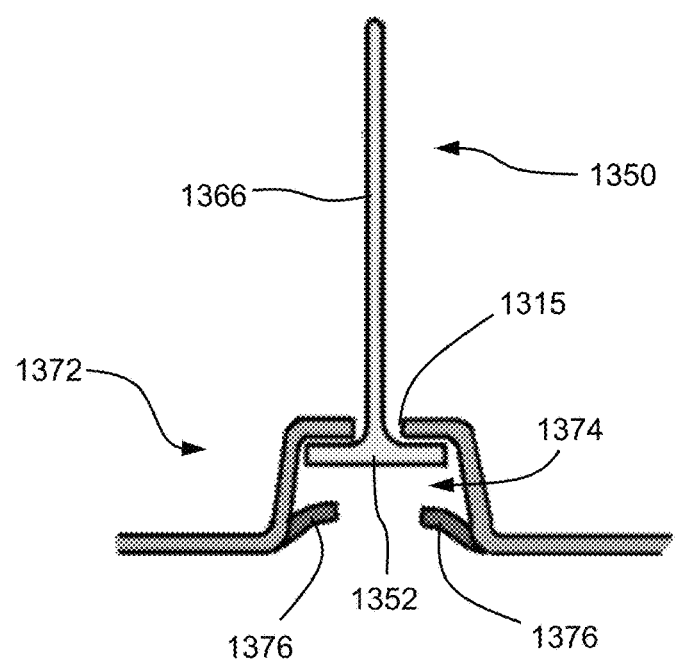
FIG. 13B is a side view of the package coupling apparatus of FIG. 13A.

FIG. 13A illustrates a similar embodiment of a package coupling apparatus 1300 that includes a support plate 1310 and a hanger 1350 coupled to the support plate 1310. Likewise, package coupling apparatus 1300 includes a mechanical component that prevents the removal of the hanger 1350 from the support plate 1310. However, this component is part of the support plate 1310 rather than the hanger. As shown in FIG. 13A, support plate 1310 includes an attachment structure 1372 that facilitates the connection between the hanger 1350 and the support plate 1310. Specifically, as shown in FIG. 13B, the attachment structure 1372 may include a channel 1374 to receive the base 1352 of the hanger 1350. Attachment structure 1372 may also include an aperture 1315 through which the upper tab 1366 may extend so that the handle 1360 projects up from the support plate 1310. Further as shown in FIG. 13B, the channel 1374 may be bordered by projections 1376 that allow the insertion of hanger 1350 but hinder its removal, similar to the projections of the embodiment of FIG. 12.

The configuration of the embodiment of FIG. 13 also allows the support plate 1310 to sit flush against an upper surface of a package. By providing a space to accommodate the base 1352 of hanger 1350, the channel 1374 of the attachment structure 1372 allows the entirety of the hanger 1350 to be positioned above the lower surface of the support plate 1310. Accordingly, no portion of the hanger 1350 needs to be positioned between the support plate and the package, which allows the support plate 1310 sit completely flush against the package.

Figure 14A:
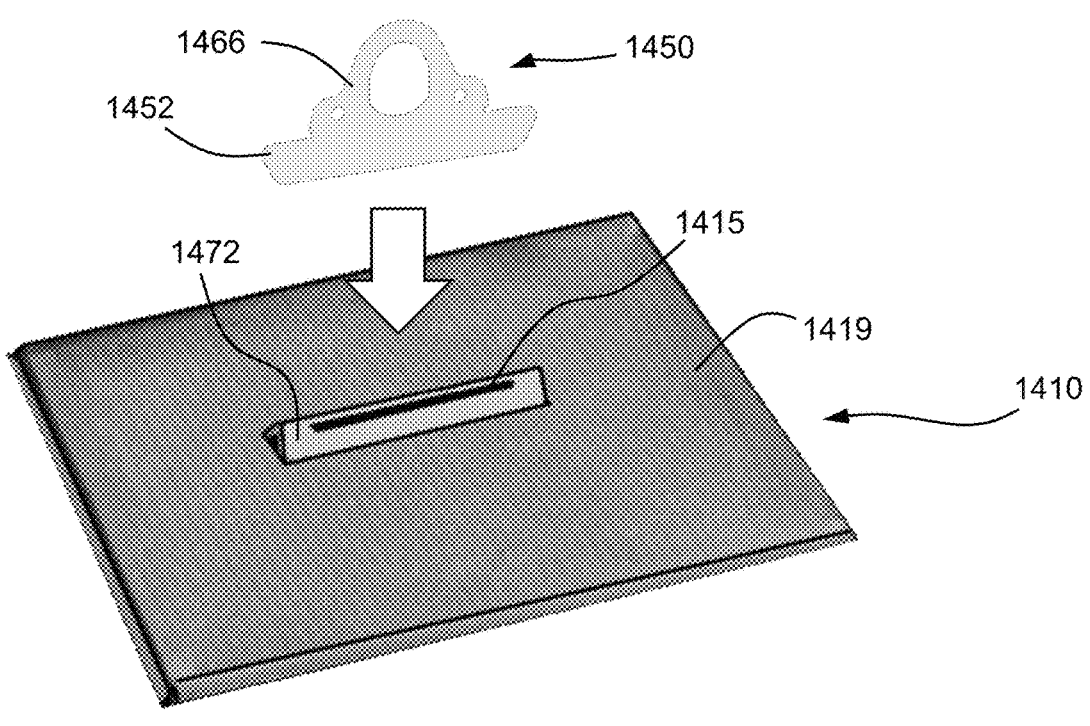
FIG. 14A is a perspective view of a hanger and support plate, according to an example embodiment.
Figure 14B:
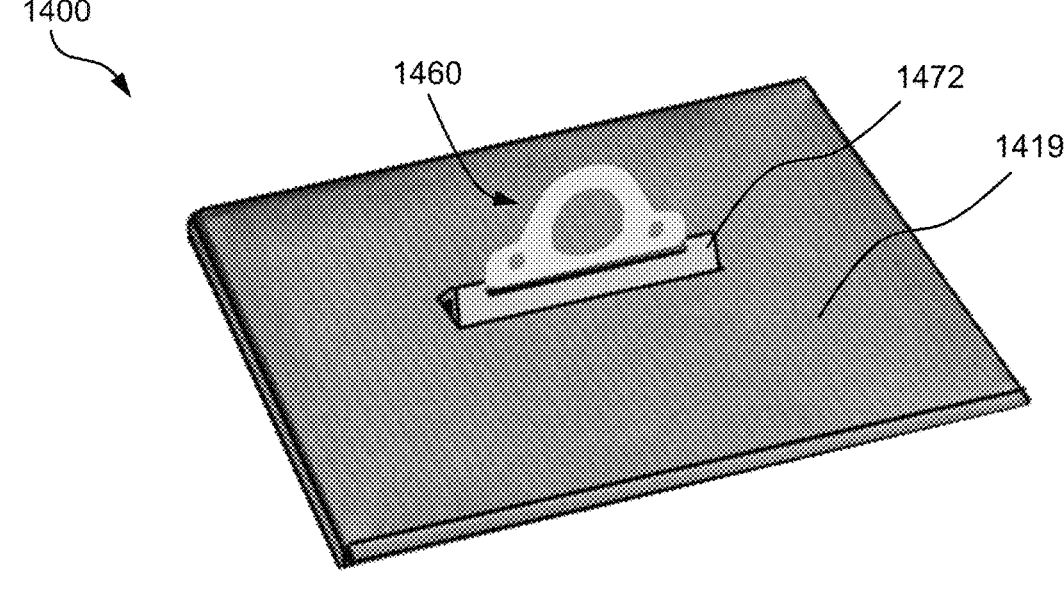
FIG. 14B is a perspective view of a package coupling apparatus formed by the hanger and support plate of FIG. 14A, according to an example embodiment.

In some embodiments, the attachment structure 1372 of the support plate 1310 may be molded into the body of the support plate 1310, as shown in FIGS. 13A and 13B. In other embodiments, the attachment structure may be formed as a separate piece that is attached to the flat body of the support plate. For example, FIG. 14A shows a support plate 1410 with a planar body 1419 and an attachment structure 1472 secured to the body 1419. The attachment structure 1472 may include an aperture 1415 for receiving a hanger 1450. As with the above-described embodiments, the hanger 1450 may include a base 1452 that prevents the hanger 1450 from passing all the way through the aperture 1415. In the illustrated embodiment, rather than extending laterally outward from the tab 1466, the base 1452 of hanger 1450 extends along the length of the hanger 1450 past the handle 1460. Accordingly the base 1452 has a length that is greater than the aperture 1415, which hinders its removal through the aperture.

Figure 15A:
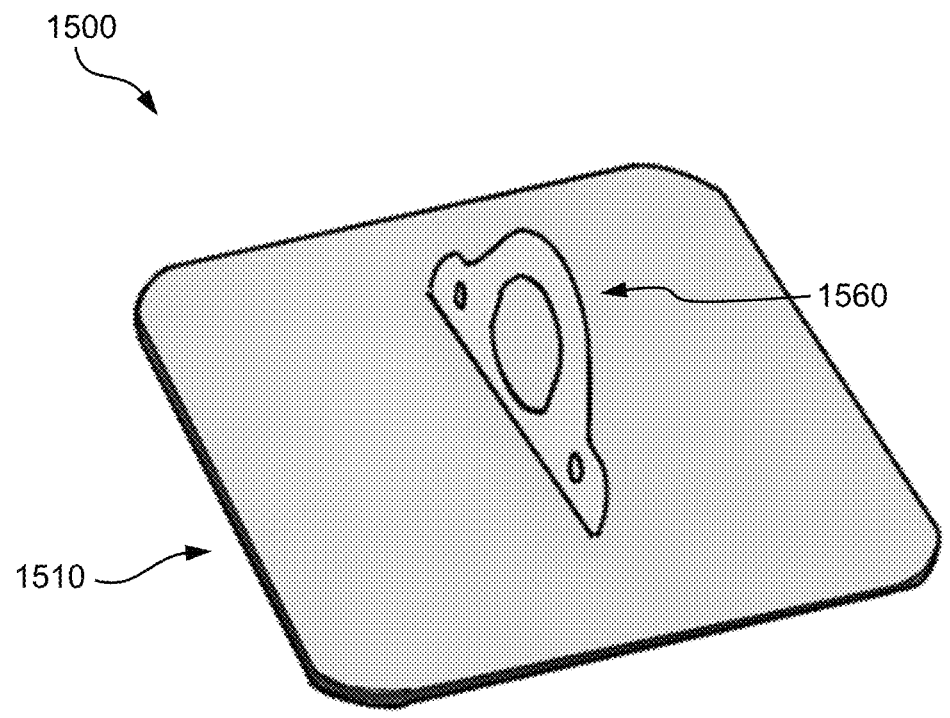
FIG. 15A is a perspective view of a package coupling apparatus, according to an example embodiment.
Figure 15B:
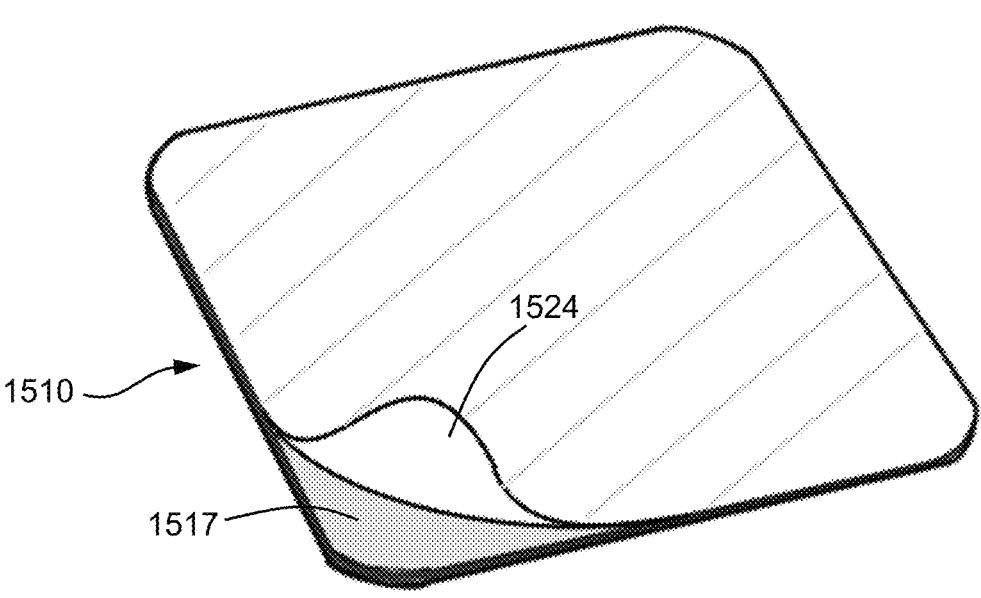
FIG. 15B is a bottom view of the package coupling apparatus of FIG. 15A with a removable backer.

In various embodiments of the package coupling apparatus, as described above, the handle may be formed on a hanger that is coupled to the support plate. As explained, embodiments of the package coupling apparatus may employ various different techniques for securing the hanger to the support plate. In other embodiments, however, the handle may be integrally formed with the support plate. For example, FIG. 15A illustrates a package coupling apparatus 1500 that includes a handle 1560 and support plate 1510 integrally formed in a single piece. As shown in FIG. 15B, the lower surface 1517 of the support plate 1510 may include a layer of adhesive and a removable backer 1524.

Figure 15C:
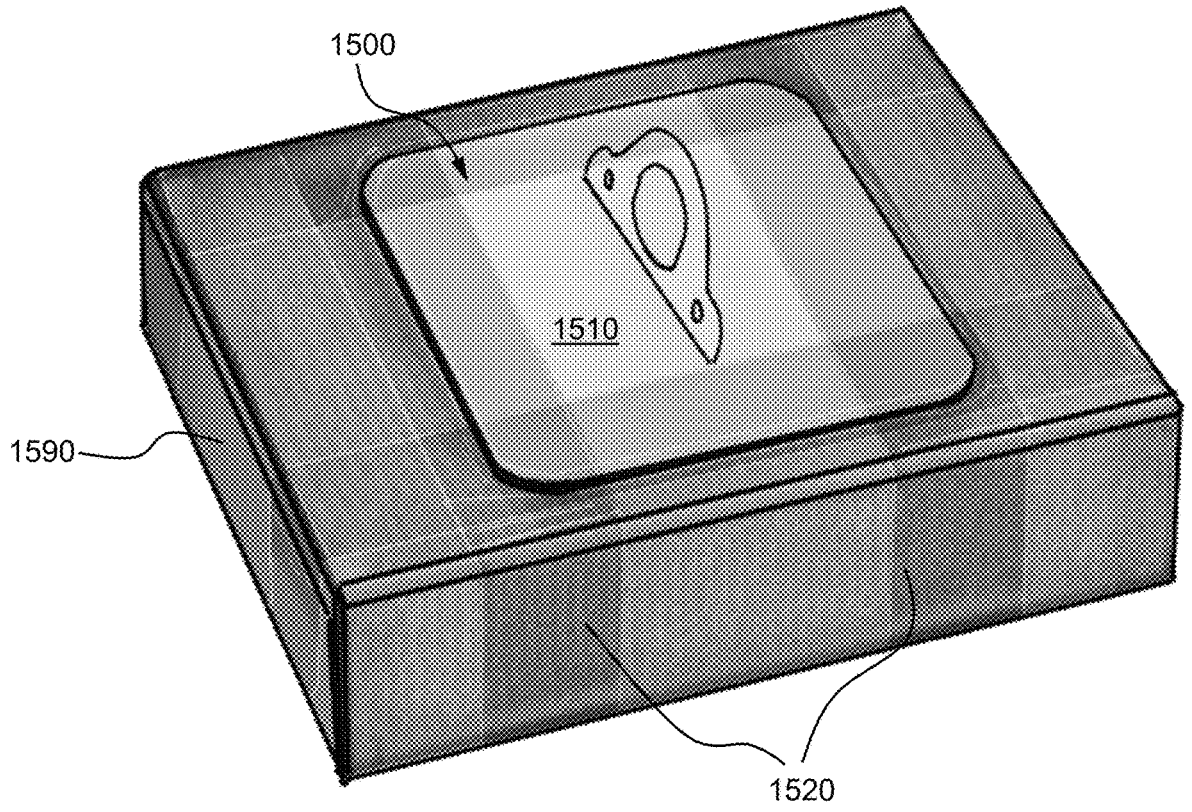
FIG. 15C is a perspective view of the package coupling apparatus of FIGS. 15A and 15B attached to a package, according to an example embodiment.

Accordingly, to secure the support plate 1510 to a package, the backer 1524 may be removed to expose the adhesive. The support plate 1510 may then be pressed against a surface of a package 1590 to attach the package coupling apparatus 1500 to the package 1590, as shown in FIG. 15C. To further strengthen the attachment of the package coupling apparatus 1500 to the package 1590, adhesive strips 1520 may be stretched over the support plate 1510 and the surface of the package, as shown in FIG. 15C.

The support plate 1510 and handle 1560 of the package coupling apparatus 1500 shown in FIGS. 15A-15C may be formed of a single material, such as a plastic material. Alternatively, the package coupling apparatus may be formed of a molded fibrous material, such as molded cardboard, or another material. In other embodiments, such as those shown in FIGS. 9-14, the package coupling apparatus may be formed from multiple pieces. In various embodiments the pieces may be formed from the same material or from different materials. For example, the hanger may be formed of a plastic material, while the support plate is formed of a fibrous material, such as cardboard, wood or bamboo. Moreover, the components may be formed of reinforced materials, such as corrugated cardboard or fiber reinforced plastics. Other materials are also possible.

VI. Conclusion

The particular arrangements shown in the Figures should not be viewed as limiting. It should be understood that other implementations may include more or less of each element shown in a given Figure. Further, some of the illustrated elements may be combined or omitted. Yet further, an exemplary implementation may include elements that are not illustrated in the Figures.

Additionally, while various aspects and implementations have been disclosed herein, other aspects and implementations will be apparent to those skilled in the art. The various aspects and implementations disclosed herein are for purposes of illustration and are not intended to be limiting, with the true scope and spirit being indicated by the following claims. Other implementations may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

What is claimed is:

1. A package coupling apparatus for securing a package carrying a payload to an unmanned aerial vehicle (UAV), the package coupling apparatus comprising:
   a support plate including an aperture, the support plate being configured to be secured to an upper surface of the package; and
   a hanger including a base and a handle extending up from the base, wherein the handle is part of a flat tab that includes a handle opening, a bridge that extends over the handle opening, and holes configured to receive locking pins wherein the base is coupled to the support plate such that the flat tab extends through the aperture of the support plate and the handle extends up from the support plate, and wherein the bridge is configured to be secured by a component of the UAV.

2. The package coupling apparatus of claim 1, wherein the base of the hanger is flat and disposed beneath the support plate.

3. The package coupling apparatus of claim 1, wherein at least a portion of a lower surface of the support plate is coated with an adhesive for securing the support plate to the package.

4. The package coupling apparatus of claim 1, further comprising a plurality of flaps extending outward from edges of the support plate, and wherein inner surfaces of the flaps are coated with an adhesive.

5. The package coupling apparatus of claim 4, wherein the plurality of flaps includes end flaps extending from the ends of the support plate and side flaps extending from the sides of the support plate.

6. The package coupling apparatus of claim 1, wherein the support plate is formed of cardboard, wood or bamboo.

7. The package coupling apparatus of claim 6, wherein the hanger is formed of plastic.

8. The package coupling apparatus of claim 1, wherein the support plate includes a plurality of hinges for adapting to packages of different sizes.

9. A system for carrying a payload using an unmanned aerial vehicle (UAV), the system comprising:

a package for housing the payload, the package having an upper surface and a lower surface; and a package coupling apparatus including:

a support plate including an aperture, the support plate being secured to the upper surface of the package; and a hanger including a base and a handle extending up from the base, wherein the handle is part of a flat tab that includes a handle opening, a bridge that extends over the handle opening, and holes configured to receive locking pins, wherein the base is coupled to the support plate such that the flat tab extends through the aperture of the support plate and the handle extends up from the support plate, and wherein the bridge is configured to be secured by a component of the UAV.

10. The system of claim 9, wherein the lower surface of the support plate is attached to the upper surface of the package with adhesive.

11. The system of claim 9, wherein the package coupling apparatus includes a plurality of flaps extending outward from edges of the support plate, and wherein the flaps are attached to side surfaces of the package with adhesive.

12. The system of claim 11, wherein the plurality of flaps includes end flaps extending from the ends of the support plate and side flaps extending from the sides of the support plate.

13. The system of claim 11 wherein the support plate includes a plurality of hinges for adapting to packages of different sizes.

14. The system of claim 9, wherein the support plate is formed of cardboard, wood or bamboo.

15. The system of claim 14, wherein the hanger is formed of plastic.

* * * * *